United States Patent [19]
Okada et al.

[11] Patent Number: 5,878,972
[45] Date of Patent: Mar. 9, 1999

[54] RELEASE PREVENTING DEVICE FOR FISHING REEL

[75] Inventors: Atuhito Okada; Yukihisa Sato; Masahiro Saeki; Yoji Yamada, all of Fuchu, Japan

[73] Assignee: Ryobi Ltd., Fuchu, Japan

[21] Appl. No.: 919,232

[22] Filed: Aug. 28, 1997

[30] Foreign Application Priority Data

Aug. 29, 1996 [JP] Japan .................................. 8-247107
Aug. 30, 1996 [JP] Japan .................................. 8-249325

[51] Int. Cl.⁶ ................................................. A01K 89/02
[52] U.S. Cl. ........................................ 242/299; 242/247
[58] Field of Search .................... 242/247, 297, 242/298, 299, 300; 192/44

[56] References Cited

U.S. PATENT DOCUMENTS

| | | | |
|---|---|---|---|
| 2,672,217 | 3/1954 | Sarah | 242/298 |
| 3,874,615 | 4/1975 | Fukushima | 192/44 |
| 4,185,723 | 1/1980 | Kelbel | 192/36 |
| 4,230,211 | 10/1980 | Goto et al. | 192/35 |
| 4,415,072 | 11/1983 | Shoji et al. | 192/45 |
| 5,370,330 | 12/1994 | Uehara et al. | 242/247 |
| 5,372,323 | 12/1994 | Hirano et al. | 242/299 |
| 5,443,147 | 8/1995 | Gratzer | 192/27 |
| 5,485,969 | 1/1996 | Yamaguchi | 242/247 |
| 5,494,232 | 2/1996 | Hirano et al. | 242/247 |
| 5,547,140 | 8/1996 | Kawabe et al. | 242/247 |
| 5,570,851 | 11/1996 | Yamaguchi et al. | 242/247 |
| 5,586,734 | 12/1996 | Kawabe et al. | 242/247 |
| 5,662,286 | 9/1997 | Hirano | 242/247 |
| 5,678,781 | 10/1997 | Hirano et al. | 242/247 |

FOREIGN PATENT DOCUMENTS

| | | |
|---|---|---|
| 38-25312 | 11/1963 | Japan . |
| 48-90882 | 11/1973 | Japan . |
| 52-137552 | 11/1977 | Japan . |
| 54-141285 | 11/1979 | Japan . |
| 56-143823 | 11/1981 | Japan . |
| 64-38964 | 3/1989 | Japan . |
| 4-77774 | 7/1992 | Japan . |
| 6-225673 | 8/1994 | Japan . |
| 7-246047 | 9/1995 | Japan . |

*Primary Examiner*—John P. Darling
*Attorney, Agent, or Firm*—Oliff & Berridge, PLC

[57] ABSTRACT

A release preventing device for a fishing reel provided with a one-way clutch that allows a rotating body, such as the spool of a double-bearing type fishing reel and the rotor of a spinning reel, to rotate in one direction but restricts rotation of that rotating body in the other direction. Rotation is restricted in the reverse direction, the direction in which fishing line is released, by a wedge effect, wherein roller members are wedged between an inner race and an outer race.

24 Claims, 10 Drawing Sheets

RELEASE PREVENTING DEVICE FOR FISHING REEL

BACKGROUND OF THE INVENTION

The present invention relates to a release preventing device for a fishing reel, and more particularly, to a release preventing device provided with a one-way clutch that allows a rotating body, such as the spool of a double-bearing type fishing reel and a rotor of a spinning reel, to rotate in one direction but restricts rotation of that rotating body in the other direction by means of a wedge effect from roller members.

In a release preventing device for a fishing reel as described in Japanese Patent Application Kokai (OPI) No. SHO-48-90882 and Japanese Utility Model Application Kokai (OPI) No. SHO-64-38964, an inner race and an outer race of a one-way clutch are attached, respectively, to a fixed member of a reel body and to a rotatable part. The rotatable part is for example, a handle rotatably supported by the reel body and a rotatable part drivingly connected to a motor. The wedge effect from roller members provided in a guide groove between the inner and outer races allows rotation of the rotating unit in one direction (the normal direction) but restricts rotation in the other (the reverse direction).

A release preventing device for a fishing reel as described in Japanese Patent Application Kokai (OPI) No. SHO-54-141285 is provided with bearings between a shaft sleeve portion of a rotor rotatably supported in the reel body, and a front portion of the reel body. The bearings are provided for rotation in only the normal direction, while rotation in the reverse direction is restricted according to a wedge effect from roller members. A restricting plate rotatably provided on the front side of the bearings contains locking pieces that protrude into a guide groove retaining the roller members. When the restricting plate is rotated by an operating rod supported on the reel body, the roller members are changed to a non-wedge position, allowing the rotating body to rotate in the reverse direction.

A unit assembly for a release preventing device is described in Japanese Patent Application Kokai (OPI) No. HEI-6-58348. In this unit assembly, an annular holder is provided for restricting front-and-rear movement of the roller members described in Japanese Patent Application Kokai (OPI) No. SHO-54-141285. Further, an external frame (outer race) for restricting radially outward movement of the roller members is fitted tightly around the outside of the annular holder.

Another unit assembly for a release preventing device is described in Japanese Patent Application Kokai (OPI) No. HEI-6-225673. In this unit assembly, an external frame (outer race) for restricting radially outward movement of the roller members is rotatably fitted around the outside of the annular holder described in Japanese Patent Application Kokai (OPI) No. HEI-6-58348. In addition, the roller members are changed to a non-wedge position when the annular holder is rotated by an operating rod supported on the reel body.

Japanese Patent Application Kokai (OPI) No. HEI-7-246047 discloses a release preventing device in which an annular holder is integrally provided with the reel body in a concentric arrangement with a rotatable part such as a shaft sleeve portion of the rotor and is positioned radially outwardly of the shaft sleeve portion. The annular holder retains roller members which are in contact with the rotatable part for restricting rotation of the rotatable part in one direction. Further, an external frame (outer race) is rotatably disposed around the annular holder for preventing radially outward displacement of the roller members. An operating rod supported by the reel body rotates the external frame so as to switch the roller members into non-wedge position.

However, in the release preventing devices described in these publications rotation of the rotatable part such as the shaft sleeve of the rotor is prevented by radially inward movement of the roller members, while radially outward movement of the roller members is restrained by the external frame or the outer race. For this reason, restriction of rotation is performed at a position as close to the rotational center of the rotating body as possible. Hence, not only is it difficult to create sufficient restrictive force, but a large rotational force may widen the guide groove due to the wedge effect of the roller members, inviting deformation or damage to the outer race.

In a technique described in Japanese Utility Model Application Kokai (OPI) No. HEI-4-77774 for improving the rotational restrictive strength and the durability of a release preventing device, the device is provided with bearings on an inner peripheral surface of a hollow cylindrical portion of a rotor. The bearings are provided for rotation of a rotatable part in only the normal direction, while rotation in the reverse direction is restricted according to a wedge effect from roller members. When pawls are disengaged by an operating rod supported on the reel body from depressions provided on the inner periphery of the internal frame (inner race), the rotatable part can rotate in the reverse direction. An external frame (outer race) is provided on the inner peripheral surface of the hollow cylindrical portion of the rotor for restricting radially outward movement of the roller members.

According to the bearings described in Japanese Utility Model Application Kokai (OPI) No. HEI-4-77774, rotation of the internal frame is restricted by radially inward movement of the roller members, while radially outward movement of the roller members is restrained by the external frame or the outer race. This configuration incurs the same problems described above.

Further, in the release preventing device of Japanese Utility Model Application Kokai (OPI) No. HEI-4-77774, since permission and prevention of the reversal rotation of the internal frame is performed by engagement and disengagement of the pawls with and from the depressions formed on the inner periphery of an internal frame, the operating speed degrades in comparison to a configuration allowing rotation in the reverse direction when the roller members are moved to a non-wedge position. Also, since an external frame (outer race) for restricting radially outward movement of the roller members is provided on the inner peripheral surface of the hollow cylindrical portion of the rotor, the roller members may be separated from the internal frame (inner race) due to centrifugal force if the rotor is rotated at high speed. As a result, quick and reliable release prevention cannot be achieved.

In order to avoid this separation problem, biasing means can be provided to urge the roller members radially inwardly, i.e., in a wedge effecting direction to provide such reliable release prevention. However, the strengthened urging force will affect smooth normal rotation of the internal frame because the roller members are forcibly urged onto the internal frame.

As information, U.S. Pat. No. 4,185,723 discloses an automatic four-wheel drive transfer case having a friction clutch. U.S. Pat. No. 4,415,072 discloses a one-way clutch formed between an inner race and an outer race. U.S. Pat.

No. 4,230,211 discloses a free wheel hub apparatus for vehicles. U.S. Pat. No. 5,443,147 discloses a rotationally dependent free-wheeling coupling. Japanese patent application Kokai (OPI) No. SHO 56-143823 and Japanese patent publication No. SHO 38-25312 disclose a one way clutch. Japanese patent application Kokai (OPI) No. SHO52-137552 discloses an intermittent rotation clutch.

SUMMARY OF THE INVENTION

In view of the foregoing, it is an object of the present invention to provide a release preventing device for a fishing reel excelling in rotational restrictive strength, in durability, and in operating speed.

This and other objects of the present invention will be attained by providing a release preventing device for a fishing reel including a handle, a fishing line winding member, a fixed part, and a rotatable part rotatably supported by the fixed part for transmitting rotation force provided by the handle or an electric source to the fishing line winding member, and the release preventing device comprising a one-way clutch provided between the fixed part and the rotatable part, the one-way clutch including at least one roller member having a diameter, an inner race and an outer race. The inner race is provided to the fixed part and has an outer periphery formed with a cam surface in contact with the roller member for restraining radially inner movement of the roller member. The cam surface has a regular polygonal shape provided with corners and sides. The outer race is provided at the rotatable part and is positioned radially outwardly of the inner race in concentrical relation thereto. The outer race has an inner peripheral surface in confrontation with the cam surface. The roller member is movable relative to the inner and outer races between a wedge position and a non wedge position. A distance between a center of each side of the cam surface and the inner peripheral surface of the outer race is greater than the diameter of the roller member for allowing the outer race to be rotatable in both fishing line rewinding and releasing directions when the roller member is moved to the non-wedge position. A distance between each corner of the inner race and the inner peripheral surface of the outer race is smaller than the diameter of the roller member for pinching the roller member between the inner and outer races to provide a wedge effect for preventing the rotatable part from being rotated in a fishing line releasing direction when the roller member is moved to the wedge position.

DETAILED DESCRIPTION OF THE PREFERRED EMBODIMENTS

Figure 1:
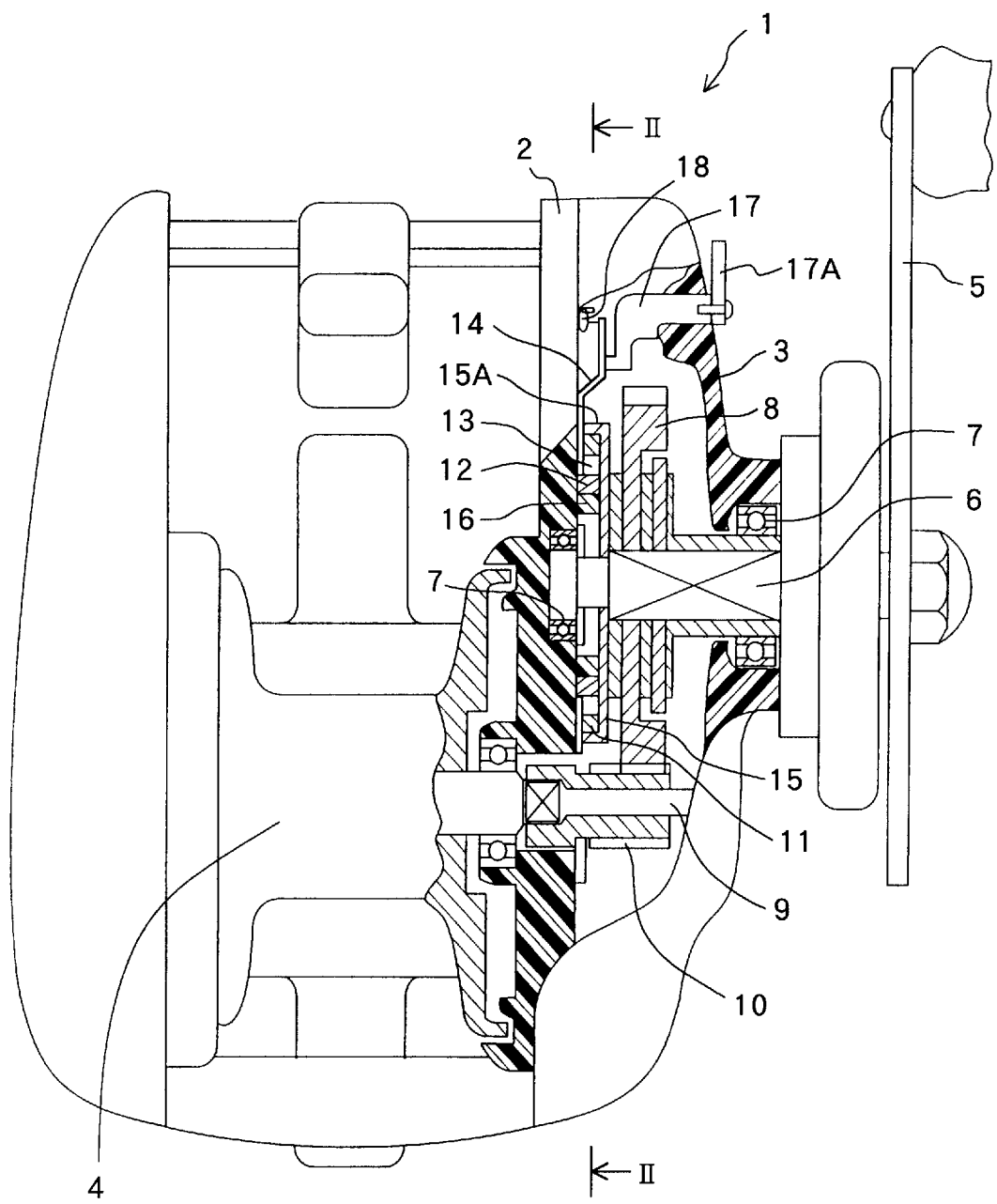
FIG. 1 is a side cross-sectional view showing an essential portion of a double-bearing type fishing reel incorporating a release preventing device according to a first embodiment of the present invention.

A release preventing device for a fishing reel according to a first embodiment of the present invention will be described with reference to FIGS. 1 through 3(b). The release preventing device of the first embodiment is applied to a double-bearing type fishing reel 1.

The double-bearing type fishing reel 1 includes a reel body 2, a side plate 3 fixed to the reel body 2, a spool 4, which is a rotatable part, rotatably supported in the reel body 2 for winding and unwinding a fishing line, and a handle 5 for rotating the spool 4. A handle shaft 6 is coupled with the handle 5. Bearings 7 are provided to rotatably support the handle shaft 6 within a space defined by the reel body 2 and the side plate 3. A master gear 8 is provided on the handle shaft 6 at a position between the reel body 2 and the side plate 3. The master gear 8 is connected to the handle shaft 6 by means of a drag mechanism well-known in the art, allowing the master gear 8 to rotate either integrally with the handle shaft 6 or relative to the handle shaft 6.

A spool shaft 9 extends from the spool 4 and is rotatably supported between the reel body 2 and the side plate 3. A pinion gear 10 is provided on the spool shaft 9 and is selectively disengageable from the spool shaft 9 by a clutch assembly well-known in the art. The pinion gear 10 is meshedly engaged with the master gear 8. Therefore, rotations of the handle 5 fixed to the handle shaft 6 are transferred to the spool 4 via the master gear 8 and the pinion gear 10, rotating the spool 4 in the winding (reeling-in) or releasing (paying-out) direction.

A one-way clutch includes an outer race 11, an inner race 12, roller members 13 (alternatively, ball-shaped members can be used), and a switching member 14. A flange 15 is concentrically fixed to the handle shaft 6. A cylindrical portion 15A is formed on the rim of the flange 15 coaxial with the handle shaft 6. The outer race 11, whose annular inner peripheral surface is formed in a true circular shape, is fixed to the inner peripheral surface of the cylindrical portion 15A. A protruded cylinder 16 is provided on the reel body 2, which is a fixed part and is coaxial with the handle shaft 6. An outer peripheral surface of this protruded cylinder 16 supports the inner race 12 to oppose the outer race 11.

Figure 3:
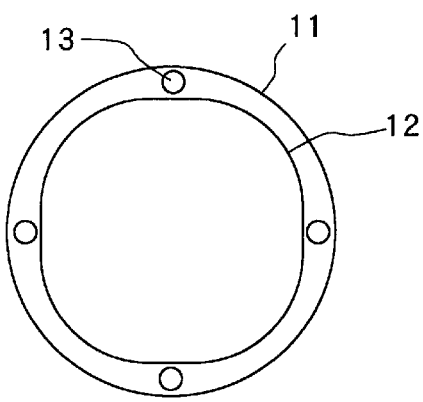
FIG. 3(a) is a diagram showing state of rollers in a non-wedge position according to the first embodiment.
FIG. 3(b) is a diagram showing state of rollers in a wedge position according to the first embodiment.
Figure 3:
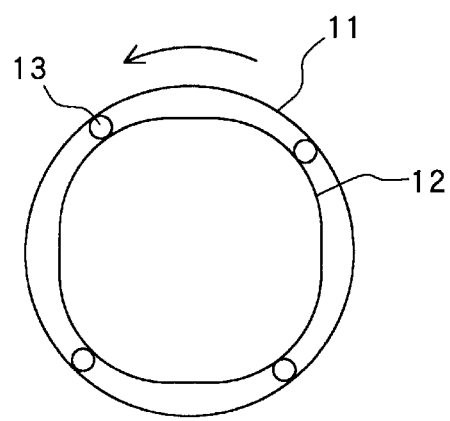

Although an inner peripheral surface of the inner race 12 is circular, the outer peripheral surface has a regular square shape, an approximate square shape, or an approximate square shape with rounded corners. Hence, an approximately annular guide groove S is formed between the inner race 12 and the outer race 11. However, the width of the guide groove S in the radial direction of the handle shaft 6 is not regular. As shown in FIG. 3(*a*), the width of the guide groove S is the largest between the side central points on the outer side of the inner race 12 and the inner side of the outer race 11. At these points, the width of the guide groove S is wider than the diameter of the roller members 13. The width of the guide groove S is smallest between the corners of the inner race 12 and the outer race 11. At these points, the guide groove S is smaller than the diameter of the roller members 13.

A plurality of engaging protrusions 16A protrude radially outwardly from the outer periphery of the protruded cylinder 16 and extend in the axial direction of the protruded cylinder 16. Opposing the engaging protrusions 16A, a plurality of engaging grooves 12*a* with cross-sectional contours slightly larger than those of the engaging protrusions 16A are formed on the inner periphery of the inner race 12. Each engaging groove 12*a* extends in the axial direction of the inner race 12. Through an engagement of the engaging protrusions 16A and the engaging grooves 12*a*, the protruded cylinder 16 can maintain the inner race 12 in a predetermined posture. As is described below, the relationship between the width of the guide groove S and the roller members 13 controls the rotation of the spool 4, allowing the spool 4 to rotate in the normal and reverse directions or preventing rotation in the reverse direction. Therefore, the fixed posture of the square inner race 12 with respect to the reel body 2 is very important for the timing in preventing reverse rotation of the spool 4. Hence, the inner race 12 is maintained in the correct posture by the reel body 2 by means of the engagement of the engaging protrusions 16A with the engaging grooves 12*a*.

A plurality of the roller members 13 (one for each side of the outer surface of the inner race 12, or four in this case) are positioned in the guide groove S. These roller members 13 are supported by the switching member 14 to be able to move along the perimeter of the outer race 11. The switching member 14, which is disk-shaped, is rotatably supported on the external surface of the inner race 12 and is rotatably positioned at a side of the reel body 2 or at a side of the outer race 11 or the flange 15. An engaging portion 14A projects radially outwardly from the external surface of the switching member 14. An operating member 17 rotatably supported in the side plate 3 is engaged with the engaging portion 14A. A control knob 17A is fixed on the operating member 17. When the user manipulates the control knob 17A, the switching member 14 is rotated on the inner race 12 via the engaging portion 14A.

Positioning protrusions 14B are provided on the switching member 14 so as to protrude onto opposing sides of the roller members 13 in the peripheral direction of the outer race 11. That is, each one of the roller members 13 is interposed between a pair of positioning protrusions 14B and 14B positioned side by side in the circumferential direction of the outer race 11. Hence, as the switching member 14 rotates, each of the roller members 13 moves in the same rotated direction. A spring 18 is interposed between the engaging portion 14A of the switching member 14 and the reel body 2, so as to continually urge the switching member 14 and roller members 13 in a "wedge" direction. The wedge direction is the direction in which the switching member 14 rotates on the inner race 12 in a counterclockwise direction, moving the roller members 13 toward the narrow portions of the guide groove S, as shown in FIG. 3(*b*). Hence, the wedge effect when the handle shaft 6 rotates in the reverse direction is reliably achieved by the spring 18 urging the switching member 14 in the wedge direction.

Although not shown in the drawings, a torsion coil spring having an urging force stronger than that of the spring 18 is connected between the control knob 17A and the side plate 3. When manipulation of the control knob 17A causes the torsion coil spring to exceed its dead point and change shape, the force of the torsion coil spring will change directions and urge the control knob 17A in the direction that the control knob 17A was manipulated. Similarly, if the control knob 17A is manipulated in the reverse direction until the torsion coil spring again exceeds its dead point, the torsion coil spring will again change directions and urge the control knob 17A in the original direction. Since the urging force of the torsion coil spring is stronger than the spring 18, the control knob 17A will always be maintained in the position to which the knob is manipulated. Hence, even if the user manipulates the control knob 17A so that the switching member 14 moves in the non-wedge direction, the torsion coil spring will overcome the urging force of the spring 18 and maintain the control knob 17A in the position rotated to by the user.

Figure 2:
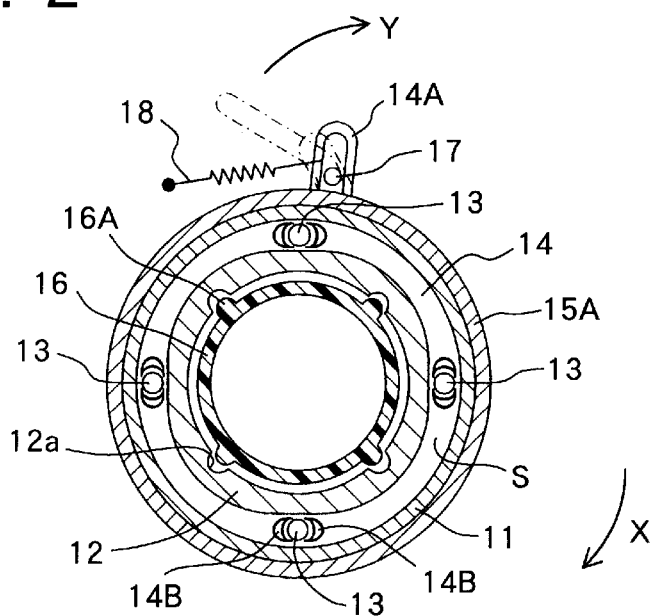
FIG. 2 is a cross-sectional view taken along the line II—II of FIG. 1.

With the configuration described above, when the control knob 17A is pulled downward, the torsion coil spring not shown will overcome the urging force of the spring 18. As a result, the switching member 14 will not be urged in the wedge direction, and the roller members 13 will be positioned by the positioning protrusions 14B near the side centers of the inner race 12, as shown in FIGS. 2 and 3(*a*). At this time, the radial distance between the side of the inner race 12 and the inner surface of the outer race 11 is larger than the diameter of the roller members 13, allowing the roller members 13 to rotate. Therefore, the combination of the roller members 13 and the inner race 12 does not prevent the outer race 11 from rotating, and the handle 5 can be rotated in the forward or reverse directions. In other words, the handle shaft 6 can rotate in either the normal direction for winding in the fishing line, as indicated by the direction arrow X in FIG. 2, or the reverse direction for paying out fishing line, which is opposite the direction arrow X. Accordingly, the spool 4 can also rotate in the winding-in and paying-out directions.

From this state, if the control knob 17A is rotated in the direction indicated by the direction arrow Y in FIG. 2, the switching member 14 will be rotated opposite the direction X, and the positioning protrusions 14B on the switching member 14 will move the roller members 13 in the wedge direction. At this time, the inner race 12 restricts inward movement of the roller members 13 in the radial direction of the outer race 11, so that the roller members 13 move radially outwardly. Accordingly, the roller members 13 become wedged between the outer race 11 and the inner race 12. In other words, the roller members 13 are moved toward the corner portions of the inner race 12 until becoming pinched tightly between the outer race 11 and inner race 12.

In this state, when the handle 5 is rotated in the winding-in direction, the outer race 11 can rotate in the direction indicated by X in FIG. 2. That is, when the outer race 11 rotates in the direction X, the pinching force created by the outer race 11 and the inner race 12 on the roller members 13 is decreased. Therefore, the roller members 13 and the inner race 12 do not prevent the outer race 11 from rotating in the direction X. In other words, rotation in the winding-in direction is possible. Further, since the spring 18 exerts a force on the switching member 14 opposite the rotational direction X, the roller members 13 are not moved back toward the side center portions of the inner race 12.

In this state, when the handle 5 is rotated in the paying-out direction, the outer race 11 is urged to be moved opposite the direction X. However, the roller members 13 and the inner race 12 prevent the outer race 11 from rotating opposite the direction X, since movement of the outer race 11 in this direction (the wedge direction) increases the pinching force on the roller members 13. Hence, rotation in the paying-out direction is prevented.

As described in the first embodiment above, the radially inward movement of the roller members 13 is prevented by the inner race 12, and rotation of the rotatable part, i.e., the handle shaft 6 is restrained by the radially outward movement of the roller member 13, the radially outward movement being provided by the centrifugal force. Accordingly, the roller members 13 are pinched between the inner race 12 and the outer race 11, preventing rotation of the handle shaft 6. With this arrangement, since the point in which rotation is restricted is as far as possible from the central axis of the handle shaft 6, a large restrictive force can be obtained. Also, since the outer race 11 has a large inner diameter, the inner surface of the outer race 11 serving as the restrictive surface for restricting rotation of the handle shaft 6, a desirably long restrictive surface can be obtained, thereby enabling prompt restriction of rotation. Since rotation of the handle shaft 6 is restricted at the furthest point from the center of the handle shaft 6, the inner and outer races 12 and 11 will not become deformed or damaged even when a large rotational force is applied. Hence, the configuration described above increases durability of the release preventing device.

By providing the inner race 12 on the reel body 2, which is a fixed part, the restrictive force from the wedge effect and the restrictive position can be accurately obtained. Since reversal rotation of the handle shaft 6 is prevented by the radially outward movement of the roller members 13 while radially inward movement of the roller members 13 is prevented by the inner race 12, the roller members 13 are prevented from releasing from the guide groove S due to centrifugal force generated when the handle shaft 6 is rotated quickly.

Further, as described above in the first embodiment, the cross-sectional contours of the plurality of engaging grooves 12a formed in the inner surface of the inner race 12 are slightly larger than those of the plurality of engaging protrusions 16A formed in the outer surface of the protruded cylinder 16. Therefore, the inner race 12 can move slightly from the rotational axis in a diametric direction. If the inner race 12 is fitted tightly over the protruded cylinder 16, then the inner race 12 and the handle shaft 6 must be strictly concentric when assembled, requiring a very precise formation. However, if the inner race 12 is able to move slightly in a diametric direction, such precision is not necessary to achieve concentricity. Hence, productivity can be increased by relaxing restrictions on the axial center of the rotatable part and on the formation precision of the rotatable part or the fixed member.

Further, the spring 18 is provided to urge the roller members 13 via the switching member 14 in the wedge direction. In other words, a resilient urging force is applied to all the roller members 13 by the spring 18, without needing to provide a separate urging means for each roller member. Hence, each of the rollers can be simultaneously and reliably switched to either the wedge effect position or the non-wedge effect position, and assembly can be simplified to prevent any errors during assembly.

Figure 4:
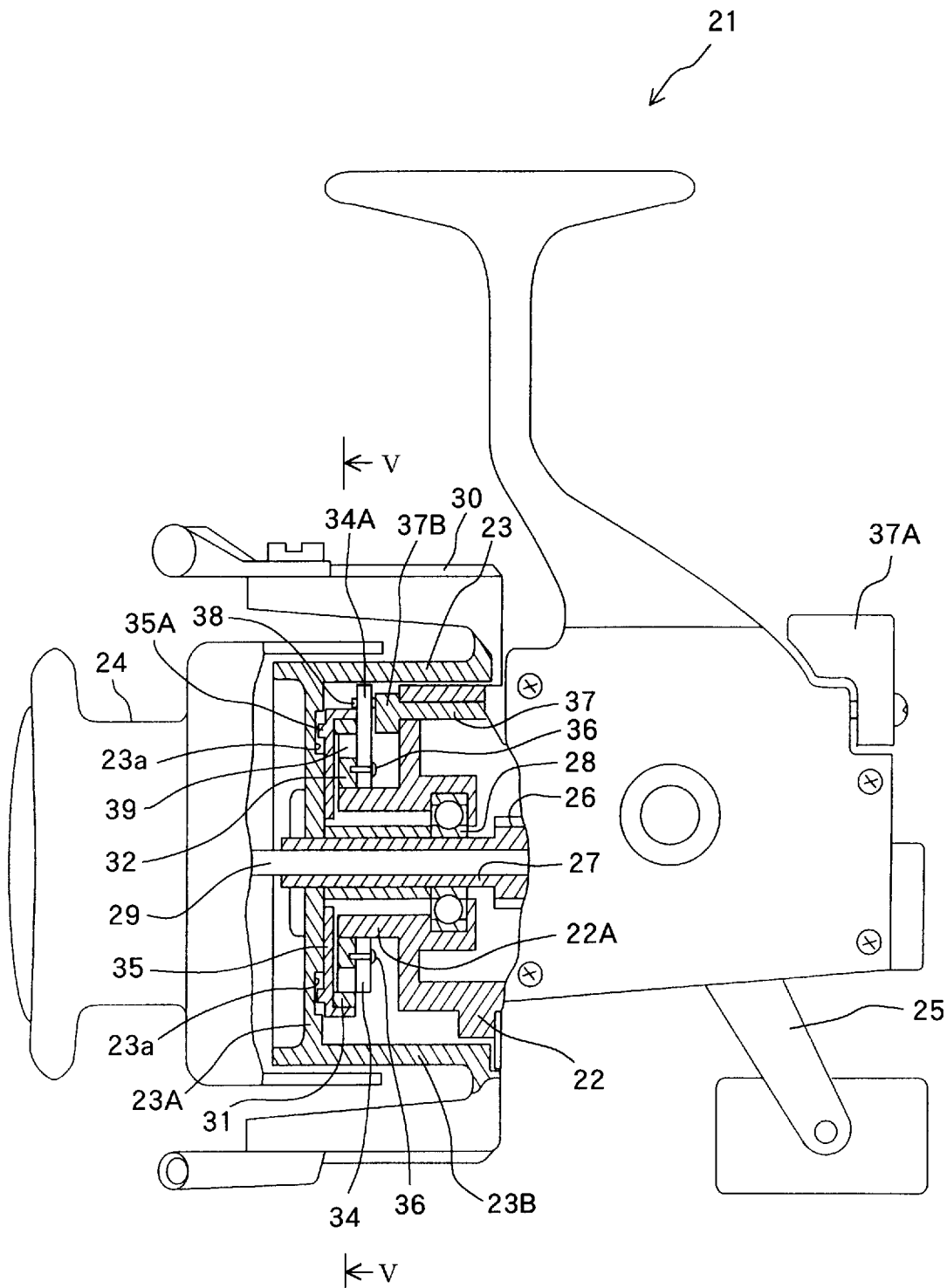
FIG. 4 is a side cross-sectional view showing an essential portion of a spinning reel incorporating a release preventing device according to a second embodiment of the present invention.

Next, a release preventing device for a fishing reel according to a second embodiment of the present invention will be described with reference to FIGS. 4 and 5. The release preventing device of the second embodiment is applied to a spinning-type fishing reel.

A spinning reel 21 includes a reel body 22, a rotor 23 rotatably supported on the reel body 22 for winding in and paying out fishing line, a spool 24 supported by the reel body 22 for retaining the wound-in fishing line, a handle 25 for rotating the rotor 23, bearings 28, a shaft sleeve 27 rotatably supported in the reel body 22 by means of the bearings 28, and a spool shaft 29 provided within the shaft sleeve 27 and connected to the spool 24 that is capable of moving back and forth in the axial direction. Within the reel body 22 are provided a master gear and spool reciprocating mechanism, which are not shown in the drawings, and a pinion gear 26 fixed to the shaft sleeve 27. The rotor 23 has a cup shaped configuration including a rear bottom portion 23A and a cylindrical portion 23B. The bottom portion 23A is fixed to the shaft sleeve 27. A pair of arm portions 30 are integrally provided on the cylindrical portion 23B for supporting both ends of a bail (not shown). The bail is supported so as to be able to rotate around the spool 24.

When the handle 25 is rotated, the force of the rotation is transferred via the master gear to the pinion gear 26, rotating the shaft sleeve 27, which is formed integrally with the pinion gear 26, and rotating the rotor 23, which is fixed to the shaft sleeve 27. The spool shaft 29 moves back and forth inside the shaft sleeve 27 by the reciprocating mechanism (not shown), causing the spool 24 to move back and forth. Hence, the fishing line is wrapped evenly over the spool 24.

A one-way clutch of the second embodiment is configured mainly of an outer race 31, an inner race 32, roller members 33, a switching member 34, and an annular holder 39. The outer race 31 is supported by the bottom portion 23A of the rotor 23, which is the rotatable part. The inner race 32 is supported by the reel body 22. More specifically, a shallow cup shaped annular metal body 35 is supported on the bottom portion 23A of the rotor 23. That is, the annular metal body 35 has a bottom portion and a ring portion. A plurality of engaging grooves 23a extending in the radial direction of the rotor 23 are formed in the underside of the bottom portion 23A. A plurality of engaging protrusions 35A are formed on the bottom portion of the annular metal body 35 for engaging with the engaging grooves 23a. These grooves 23a and protrusions 35A are sized such that when the engaging grooves 23a and the engaging protrusions 35A are engaged, the annular metal body 35 can be slightly moved in a direction diametric to the rotational center. The outer race 31, having a circular inner surface, is fixed to the inner peripheral surface of the ring portion of the annular metal body 35.

The reel body 22 has a cylinder portion 22A concentrically encircling the shaft sleeve 27. The inner race 32 is fixed on the outer surface of the cylinder portion 22A opposing the outer race 31. The inner surface of the inner race 32 is circular, but the outer surface is a regular octagon, an approximate octagon, or an approximate octagon with rounded corners. Hence, an approximately annular guide groove S1 is formed between the inner race 32 and the outer race 31. However, the width of the guide groove S1 measured in the radial direction with the shaft sleeve 27 as the center is not regular. The width of the guide groove S1 is largest between the side central points on the outer side of the inner race 32 and the internal side of the outer race 31. At these points, the width of the guide groove S1 is wider than the diameter of the roller members 33. The width of the guide groove S1 is smallest between the corners of the inner race 32 and the outer race 31. At these points, the guide groove S1 is smaller than the diameter of the roller members 33.

The annular holder 39 is rotatably positioned within the guide groove S1 formed between the outer race 31 and inner race 32. The switching member 34 is integrally formed with one axial end face of the annular holder 39. A plurality of retaining holes 39a are formed in the annular holder 39, diametrically penetrating the same. By storing one of the roller members 33 in each of these retaining holes 39a, with preventing axial displacement of the rollers, the roller members 33 can be maintained in prescribed positions. Metal reinforcing members 39A made of iron are provided at a contour of the holes 39a in contact with the roller members 33. The annular holder 39 itself is composed of a synthetic resin, resulting in a light weight construction and easier processing. However, mechanical strength of this assembly is increased at the areas supporting the roller members 33 by providing the metal reinforcing members 39A. A pair of these metal reinforcing members 39A are positioned extending in the diametric direction of the outer race 31 for each of the roller members 33, one on either side of the roller member. Therefore, as the switching member 34 rotates, each of the roller members 33 move in the same rotational direction. In this embodiment, four roller members 33, which is half the number of sides on the external surface of the inner race 32, are maintained by the annular holder 39 in the guide groove S1 and between the outer race 31 and the inner race 32. These roller members 33 are supported so as to be movable along the periphery of the outer race 31 when the switching member 34 causes the annular holder 39 to rotate.

Figure 5:
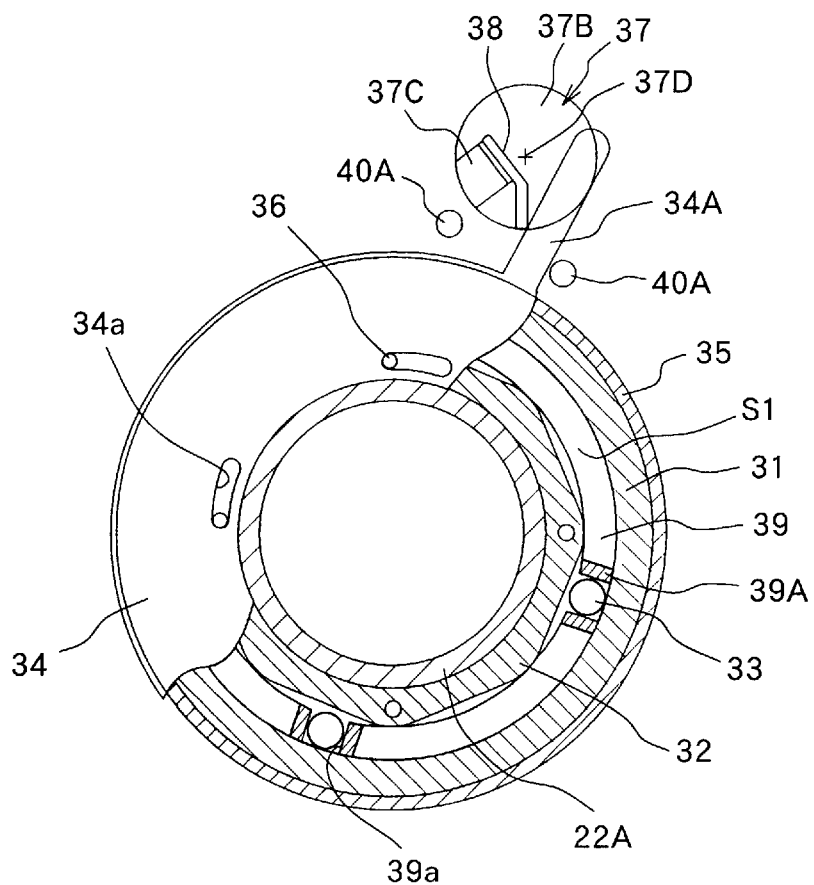
FIG. 5 is a cross-sectional view taken along the line V—V of FIG. 4.

As shown in FIG. 5, the switching member 34 is disk-shaped and is provided so that the inner periphery of the switching member 34 can rotate about the outer periphery of the cylinder portion 22A of the reel body 22. A plurality of arc-shaped slots 34a are formed in the switching member 34. Pins 36 are implanted in one axial end face of the inner race 32 to penetrate the slots 34a. Hence, the switching member 34 is supported by the inner race 32 via the pins 36 and can rotate with respect to the inner race 32 only the arcuate length of the slots 34a. The switching member 34 is supported to the inner race 32 by the pins 36, and the roller members 33 are prevented from moving outward in the radial direction of the switching member 34 by the outer race 31 fixed to the annular metal body 35, and the axial positions of the roller members 33 are maintained by the annular holder 39. Therefore, by rotatably fitting the outer race 31 in the annular metal body 35, unit assembly of the one-way clutch can be achieved.

A protrusion 34A protrudes radially outwardly from the external periphery of the switching member 34. Further, an operating member 37 extends inside of the reel body 22. The operating member 37 is rotatable about its axis 37D. The rear end portion of the operating member 37 connects to a control knob 37A, which is rotatably supported on the reel body 22. A disk portion 37B is provided at a front end portion of the operating member 37 at a position eccentric to the axis 37D. A boss 37C is provided on the disk portion 37B. A spring 38 is fixed on the boss 37C to urge the protrusion 34A. The user manipulates the control knob 37A to rotate the operating member 37 about its axis 37D. Since the disk portion 37B has an eccentric rotation, the urging force caused by the spring 38 on the protrusion 34A changes. Here, the spring 38 urges the switching member 34 in order to move the roller members 33 in a non-wedge direction. The spring 38, shown in FIG. 5, urges the protrusion 34A in a direction that causes the protrusion 34A to rotate clockwise. A pair of stopper members 40A with which the rotating protrusion 34A will abut are provided on the front surface of the reel body 22. The stopper members 40A stop the rotating protrusion 34A in order to control the range of rotation of the switching member 34.

A torsion coil spring (not shown) is provided between the inner race 32 and the annular holder 39. This torsion coil spring, which has a smaller urging force than that of the spring 38, urges the annular holder 39 and roller members 33 in the wedge direction.

With the configuration described above, when the control knob 37A is rotated in one direction, the disk portion 37B of the operating member 37 will rotate about the axis 37D in the counterclockwise direction, as viewed from FIG. 5, urging the protrusion 34A in the clockwise direction by means of the spring 38. The switching member 34 will contact the stopper member 40A on the right side of FIG. 5. In this state, the protrusion 34A will be urged by the spring 38 to rotate in the clockwise direction. As a result, the roller members 33 will be positioned by the metal reinforcing members 39A near the side centers of the inner race 32. At this time, the distance between the side of the inner race 32 and the inner surface of the outer race 31 is larger than the diameter of the roller members 33, allowing the roller members 33 to rotate. Therefore, the combination of the roller members 33 and the inner race 32 do not prevent the outer race 31 from rotating, and the handle 25 can be rotated in the forward or reverse directions. In other words, the rotor 23 can rotate in either the normal direction for winding in the fishing line or the reverse direction for paying out fishing line.

From this state, if the control knob 37A is rotated in the opposite direction, the operating member 37 will be rotated about the axis 37D in the clockwise direction, according to FIG. 5, and the disk portion 37B will rotate eccentrically, causing the spring 38 to move away from the protrusion 34A. However, since the torsion coil spring (not shown) is urging the annular holder 39 to rotate in the wedge direction, the switching member 34 also rotates in that direction. At this time, the pins 36 slide along the slots 34a until the protrusion 34A contacts the stopper member 40A on the left side of FIG. 5. Accordingly, the roller members 33 maintained in the annular holder 39 move in the wedge direction, that is the counterclockwise direction, as viewed in FIG. 5. In other words, the roller members 33 move toward the corner portions of the inner race 32 until becoming pinched tightly between the outer race 31 and inner race 32. In this state, when the handle 25 is rotated in the winding-in direction, the direction in which the outer race 31 rotates is the non-wedge direction, and the pinching force created by the outer race 31 and the inner race 32 on the roller members 33 is decreased. Therefore, the roller members 33 and the inner race 32 do not prevent the outer race 31 from rotating. In other words, rotation in the winding-in direction is possible.

In this state, when the handle 25 is rotated in the paying-out direction, the outer race 31 attempts to rotate, but the roller members 33 and the inner race 32 prevent the outer race 31 from rotating, because movement of the outer race 31 in the wedge direction increases the pinching force on the roller members 33. Hence, rotation in the paying-out direction is prevented.

When in the wedge position, the roller members 33 are pinched between the outer race 31 and the inner race 32. Accordingly, the switching member 34 cannot easily rotate toward the non-wedge position, even by manipulating the control knob 37A. If the operating member 37 were directly connected to the protrusion 34A of the switching member 34, then when the switching member 34 is forcibly rotated by pulling strongly on the control knob 37A against the pinching force, the operation transfer system that includes the switching member 34, roller members 33, inner race 32, and inner race 32 could become deformed or damaged. In the present embodiment, however, the spring 38 is provided between the operating member 37 and switching member 34 to prevent such deformation and damage. If the control knob 37A is manipulated when the roller members 33 are tightly pinched between the outer race 31 and inner race 32, these mechanical parts can be protected by only the resilient deformation of the spring 38. The switching member 34 can afterwards rotate in the non-wedge direction when the roller members 33 are no longer pinched between the outer race 31 and the inner race 32.

As described in the second embodiment similar to the first embodiment, the rotation of the rotor 23 is restricted by the radially outward movement of the roller members 33 while radially inner movement of the roller is prevented by the inner race 32 so that the roller members 33 are pinched between the inner race 32 and the outer race 31. With this arrangement, the point in which rotation is restricted is as far as possible from the axial center of the rotor 23. Thus, large restrictive force can be obtained. Also, since the inner surface of the outer race 31 has a large diameter, the inner surface of the outer race 31 that serves as the restrictive surface for restricting rotation of the rotor 23 is as long as possible, enabling prompt restriction of rotation. Since rotation of the rotor 23 is restricted at the furthest point from the center of the rotor 23, the inner and outer races 32 and 31 will not become deformed or damaged even when a large rotational force is applied. Hence, the configuration described above increases durability of the release preventing device.

Further, similar to the first embodiment, by providing the inner race 32 on the reel body 22 which is the fixed part, the wedge effecting position and the restrictive force can be accurately obtained. Since radially inward movement of the roller members 33 is prevented by the inner race 32 and, the wedge effect is provided by the radially outer movement of the roller members 33, the roller members 33 are prevented from releasing from the guide groove due to centrifugal force generated when the rotor 23 is rotated at relatively high speed.

Further, in the second embodiment, the annular metal body 35 to which the outer race 31 is fixed, and the rotor 23 are configured as two separate parts, eliminating the need for the two parts to be made strictly concentric, since concentricity can be obtained by adjusting the installation position of the annular metal body 35 in relation to the rotor 23. In addition, by configuring the annular metal body 35 and rotor 23 as separate parts, the rotor 23 can be constructed of a light material such as resin, reducing the overall weight of the fishing reel and reducing centrifugal force. Hence, balance of the rotor rotation can be more easily achieved.

Further, the annular metal body 35 fixing the outer race 31 is supported so as to be slightly movable diametrically with respect to the rotor 23. Through such diametric movement, concentricity between the rotor 23 and the outer race 31 can be even more easily achieved.

Further, since the outer surface of the inner race 32 has an approximate or regular octagonal shape, the length of the sides is shorter than that of the square-shaped surface described in the first embodiment. For this reason, prevention of rotation in the reverse direction can be achieved even quicker.

Further, since the roller members 33 are restricted in forward and backward movement (movement in the axial direction) within the retaining holes 39a of the annular holder 39, the roller members 33 can be moved along with the annular holder 39 between the inner race 32 fixed to the fixed part and the outer race 31 fixed to the rotatable part. Thus, operation of the roller members 33 can be stabilized and the wedge effect can be accurately employed. Further, since the roller members 33 are maintained by the annular holder 39, which is rotatably fitted around the inner race 32, unit assembly of these parts can be achieved, and assembly can be simplified to prevent any assembling errors.

Further, the switching member 34 is provided on the annular holder 39 rotatably fitted on the inner race 32, and the switching member 34 is rotated by the operating member 37 supported by the reel body 22 to switch both the annular holder 39 and the roller members 33 to the non-wedge position, thereby releasing the restriction on rotation of the rotor 23. Therefore, by manipulating the control knob 37A, the annular holder 39 and the roller members 33 can be switched between the wedge position and the non-wedge position. Accordingly, when reeling in a fish with the reel, switching between preventing reverse rotation of the reel and allowing such rotation can be accomplished quickly and reliably, preventing such problems as the fishing line breaking.

Figure 6:
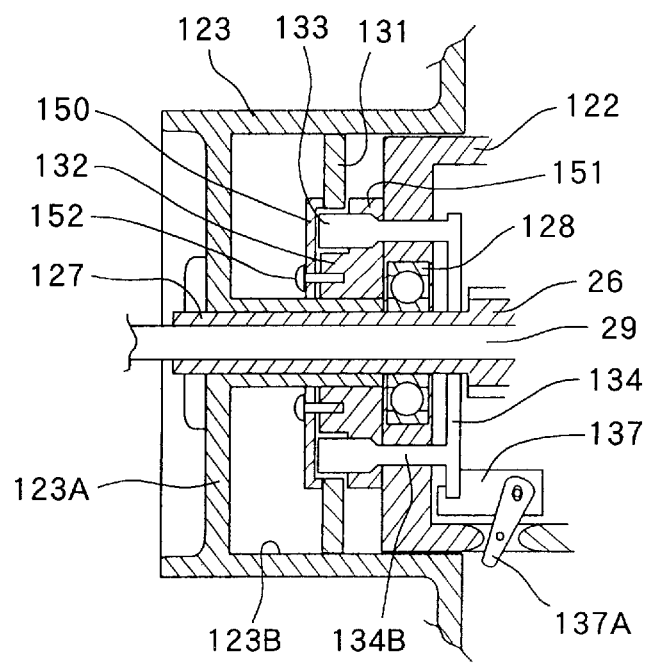
FIG. 6 is a cross-sectional view showing an essential portion of a release preventing device according to a third embodiment of the present invention.
Figure 7:
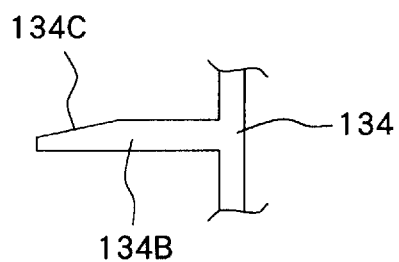
FIG. 7 is an explanatory diagram showing a switching member and an operating rod used in the release preventing device according to the third embodiment.

Next, a release preventing device for a fishing reel according to a third embodiment of the present invention will be described with reference to FIGS. 6 and 7 wherein like parts and components are designated by the same reference numerals as those shown in FIGS. 4 and 5. The release preventing device of the third embodiment, like the second embodiment, is applied to a spinning-type fishing reel.

In the third embodiment, a roller incorporated one way clutch mechanism is provided between the reel body (fixed part) and an inner hollow portion of the cup shaped rotor (rotatable part). As shown in FIG. 6, the release preventing device of the third embodiment includes a rotor 123 as the rotatable part and a reel body 122 as the fixed part.

The rotor 123 includes a bottom portion 123A and a cylindrical portion 123B. An outer race 131 having a disk shape is fixed to the inner peripheral surface of the cylindrical portion 123B of the rotor 123. The front end of the reel body 122, which is the fixed part, is positioned inside the hollow portion defined by the cylindrical portion 123B of the rotor 123. The reel body 122 rotatably supports a shaft sleeve 127 through a bearings 128. An inner race 132 is fixed on the front end face of the reel body 122. The inner peripheral surface of the inner race 132 is circular and is arranged coaxially with the shaft sleeve 127. However, the outer peripheral surface of the inner race 132, as in the second embodiment, is in the shape of a regular or approximate octagon.

An annular holder 150 is provided on the front surface of the inner race 132. The annular holder 150 is fixed to the inner race 132 by a pin 152. A flange 151 is integrally provided on the back surface of the inner race 132 and is fixed to the front surface of the reel body 122 by a screw or the like (not shown). Roller members 133 are positioned in an annular guide groove formed between the inner race 132 and the outer race 131. Movement of the roller members 133 in the forward and backward direction (the axial direction) is prevented by the annular holder 150.

Eight retaining holes are formed in the annular holder 150 at equal intervals. These retaining holes are arrayed on the same circle and extend in the circumferential direction of the outer race 131. Each retaining hole retains roller member 133 and a spring (not shown) which urges the roller member 133 in the wedge direction. Operating rods 134B of a switching member 134 described below can be retractably moved into and away from each retaining hole.

An operating knob 137A is movably supported on the reel body 122. The operating knob 137A has an inner end pivotally connected to an operating member 137. Further, one end of the operating member 137 is connected to a front end of the switching member 134. The switching member 134 is coaxially positioned in relation to the shaft sleeve 127 and can slide back and forth in the axial direction of the shaft sleeve 127 in accordance with the manipulation of the operation knob 137A. Therefore, as shown in FIG. 6, when the operating knob 137A is pivotally moved in the clockwise direction, the switching member 134 is made to recede via the operating member 137, and the roller members 133 are moved to the wedge position. When the operating knob 137A is pivotally moved in the counterclockwise direction, the switching member 134 is pushed leftwardly in FIG. 6 along the shaft sleeve 127, and the roller members 133 are moved to a non-wedge position.

The operating rods 134B extend from an end surface of the switching member 134 in the axial direction of the shaft sleeve 127. Penetration holes are formed in the flange 151 to be penetrated by the operating rods 134B. The free end of the operating rods 134B are capable of moving in and out of the retaining holes formed in the annular holder 150. The free end of each of the operating rods 134B forms a sloped surface 134C, as shown in FIG. 7, and when the operating member 137 slides into the non-wedge position, the free ends of the operating rods 134B penetrate into the retaining holes, opposing the urging force of the springs in the same retaining holes, and the roller members 133 roll up the sloped surfaces 134C. In other words, when the switching member 134 is moved leftwardly in FIG., 6 into the non-wedge position, the retaining holes each contain a spring, a roller member 133, and an operating rod 134B in the order given, when viewed in the peripheral direction of the outer race 131.

With the configuration, when the operating knob 137A is pivotally moved in the clockwise direction, the switching member 134 is pulled back via the operating member 137. As a result, the free ends of the operating rods 134B are pulled out from the retaining holes of the annular holder 150, and the roller members 133 in the retaining holes are urged toward the wedge direction by the springs. In other words, the roller members 133 are urged toward the corner portions of the inner race 132. As described above, in this state, the rotor 123 can rotate in the forward direction but not in the reverse direction.

If the operating knob 137A is pivotally moved in the opposite direction, the switching member 134 is pushed forward via the operating member 137. As a result, the free ends of the operating rods 134B penetrate into the retaining holes of the annular holder 150, opposing the urging force of the springs. The roller members 133 roll up the sloped surfaces 134C and are urged in the non-wedge direction. In other words, the roller members 133 are positioned in the center of the sides of the inner race 132. In this state, the rotor 123 can rotate in both the forward and reverse directions.

Similar to the foregoing embodiments, the release preventing device in the third embodiment achieves a large rotational restrictive force, performs prompt rotational restriction, and improves the durability of the device. Further, similar to the effects described in the foregoing embodiments, the restrictive force from the wedge effect and the restrictive position can be accurately obtained, and separation of the rollers from the device can be prevented.

Further, in the third embodiment, rotations of the rotor 123 are restricted at a position greatly spaced away from the rotational axis of the rotor 123, because the outer race 131, which restricts rotation of the rotor 123 is provided on the inner peripheral surface of the cylindrical portion 123B of the rotor 123. In short, a larger rotational restrictive force can be achieved, capable of performing even quicker restriction of rotation. Further, durability of the release preventing device can be improved, preventing deformation or damage to the outer race 131 and inner race 132, even when a large rotational force is applied. Also, the components necessary for constructing this release preventing device can be formed and provided at positions adjacent to the front surface of the reel body 122, decreasing the load on the components and, therefore, preventing deformation and damage of the same.

Further, rotation in one direction of a one-way clutch can be both restricted and allowed by switching only the roller members 133 between the wedge position and the non-wedge position, Accordingly, when reeling in a fish with the reel, switching between preventing reverse rotation of the reel and allowing such rotation can be accomplished quickly and reliably, preventing such problems as the fishing line breaking.

Figure 8:
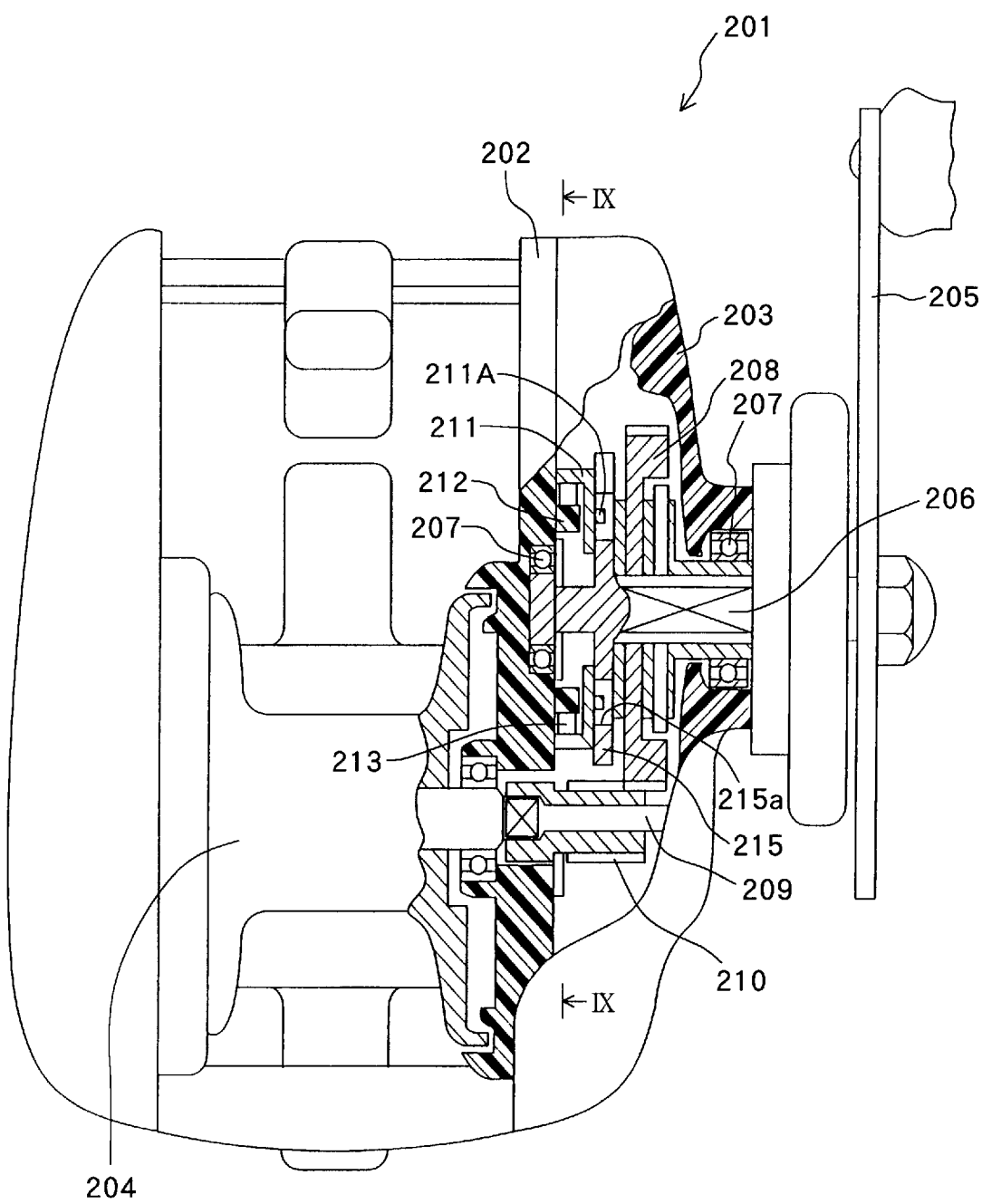
FIG. 8 is a side cross-sectional view showing an essential portion of a double-bearing type fishing reel incorporating a release preventing device according to fourth first embodiment of the present invention.

A release preventing device for a fishing reel according to a fourth embodiment of the present invention will be described while referring to FIGS. 8 and 9. The release preventing device of the fourth embodiment applies to a double-bearing type fishing reel 201. The fishing reel 201 includes a reel body 202, a side plate 203, a spool 204, a handle 205, a handle shaft 206, bearings 207, a master gear 208, a drag mechanism, a spool shaft 209, and a pinion gear 210, whose fundamental functions are the same as those of the first embodiment.

A one-way clutch includes mainly an outer race 211, an inner race 212, roller members 213, and an annular holder 214. A flange 215 is concentrically fixed to the handle shaft 206 which is a rotatable part. Elongated slots 215a are formed in the flange 215. These slots 215a extend in a radial direction of the handle shaft 206. The outer race 211 is supported to the flange 215. The outer race 211 is formed as an annular metal body having an annular portion and a bottom portion. Protrusions 211A protrude from the bottom portion of the outer race 211 and each protrusion 211A engages in each elongated slot 215a of the flange 215, so that the attached position of the outer race 211 on the flange 215 can be adjusted diametrically. The inner peripheral surface of the annular portion on the outer race 211 is formed in a true circular shape and restricts radially outward movement of the roller members 213.

The inner race 212 is integrally provided on the reel body 202, which is a fixed part, so as to protrude from the same, and is provided coaxial with the outer race 211 and the handle shaft 206. The sides on the outer surface of the inner race 212 are shaped as curved cam surfaces, together forming an approximate square shape, and oppose the circular inner peripheral surface of the outer race 211. Hence, an approximately annular guide groove S2 is formed between the inner race 212 and the outer race 211. However, the width of the guide groove S2 measured in the radial direction of the handle shaft 206 is not regular. As shown in FIG. 9, the width of the guide groove S2 is largest between the side central points on the outer periphery of the inner race 212 and the inner side of the outer race 211. At these points, the width of the guide groove S2 is wider than the diameter of the roller members 213. The width of the guide groove S2 is smallest between the corners of the inner race 212 and the outer race 211. At these points, the width of the guide groove S2 is smaller than the diameter of the roller members 213.

The annular holder 214 is integrally formed with the reel body 202 and protruding from the same around the outer periphery of the inner race 212 in the guide groove S2. Retaining holes 214a are formed in the annular holder 214, diametrically penetrating the same and spaced at regular intervals in the peripheral direction. One of the roller members 213 is provided in each of these retaining holes 214a. The roller members 213 are restricted by the wall portions (not shown in the drawings) forming the retaining holes 214a from moving in the axial direction, but can move freely in the peripheral direction of the annular holder 214. Springs 216 are provided one in each of the retaining holes 214a for applying a biasing force on the roller members 213 in the wedge direction, that is, the direction for preventing rotation of the outer race 211 by the inner race 212 and the roller members 213. When viewed in the peripheral direction of the annular holder 214, a wall on one side of each retaining hole 214a is positioned near a corner of the inner race 212, while the other wall is in contact with the spring 216. In short, the annular holder 214 is positioned in the guide groove S2, and the roller members 213 are positioned in the retaining holes 214a of the annular holder 214 and are capable of contacting the inner race 212 and the outer race 211, and further, the roller members 213 are urged by the springs 216 in the peripheral direction of the annular holder 214 toward the corners of the inner race 212.

Figure 9:
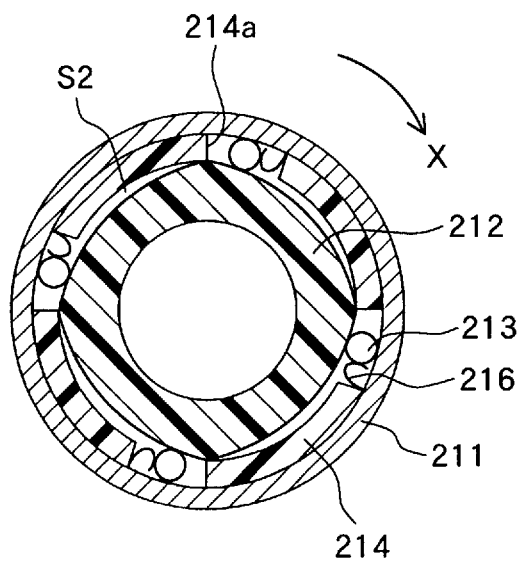
FIG. 9 is a cross-sectional view taken along the line IX—IX of FIG. 8.

With this arrangement, when the handle shaft 206 is rotated in the normal direction for winding in the fishing line, the outer race 211 rotates in the direction indicated by X in FIG. 9. At this time, rotation of the outer race 211 in the direction indicated by X causes the roller members 213 to oppose the biasing force of the springs 216 and become positioned near the side center portions of the inner race 212. Since the distance between the sides of the inner race 212 and the inner peripheral surface of the outer race 211 is larger than the diameter of the roller members 213, allowing the roller members 213 to rotate. Therefore, the combination of the roller members 213 and the inner race 212 does not prevent the outer race 211 from rotating via the wedge effect, and the handle shaft 206 can be rotated in the normal direction.

However, when the handle shaft 206 is rotated in the reverse direction for releasing fishing line, the outer race 211 rotates in the direction opposite that indicated by X, the counterclockwise direction in FIG. 9. Friction created by the outer race 211 on the roller members 213 together with the biasing force of the springs 216 cause the roller members 13 to move in the counterclockwise direction and become positioned near the corners of the inner race 212. Since the diameter of the roller members 213 is larger than the distance between the corners of the inner race 212 and the inner peripheral surface of the outer race 211, rotation of the outer race 211 is prevented by the wedge effect. Hence, the handle shaft 206 cannot be rotated in the reverse direction.

As described above in the fourth embodiment, rotation of the handle shaft 206 is restricted by the radially outward movement of the roller 213 while the radially inward movement of the rollers 213 are restrained by the cam surfaces of the inner race 212. Therefore, the point in which rotation is restricted is as far as possible from the axial center of the handle shaft 206. Thus, large restrictive force can be obtained. Also, since the outer race 211 has a large diameter, the peripheral length of the inner peripheral surface of the outer race 211 that serves as the restrictive surface for restricting rotation of the handle shaft 206 is large, enabling prompt restriction of rotation. Since rotation of the handle shaft 206 is restricted at the furthest point from the axial center of the handle shaft 206, the inner and outer races 212 and 211 will not become deformed or damaged even when a large rotational force is applied. Hence, the configuration described above increases durability of the release preventing device.

Further, by fixing the annular holder 214 on the reel body 202 to maintain the roller members 213, the restrictive force from the wedge effect and the restrictive position can be accurately obtained. Since the spool 204 is prevented from rotating in the release direction via the wedge effect by the radially outward movement of the roller 213 while restraining radially inward movement thereof by the inner race 212, the roller members 213 are prevented from leaving the guide groove S2 due to centrifugal force generated when the spool 204 is rotated quickly. Thus, reverse rotation preventing function can surely be attained.

Since the outer race 211 is in the form of annular metal body formed separately from the flange 215 on the handle shaft 206, the flange 215 can be manufactured from a synthetic resin to decrease weight, and adjusting the rotational balance of the rotatable part can be simplified. Further, since the outer race 211 is supported on the flange 215 so as to be able to move diametrically, productivity can be increased by relaxing restrictions on the axial center of the rotatable part and on the formation precision of the rotatable part.

Since the roller members 213 are provided in the retaining holes 214a of the annular holder 214, which restrict movement of the roller members 213 in the axial direction, operation of the roller members 213 between the inner race 212 and the outer race 211 can be stabilized to achieve an accurate wedge effect. Further, since the roller members 213 are retained in the annular holder 214, unit assembly of these parts can be achieved, and assembly can be simplified to prevent any errors.

Since the springs 216 are provided between the annular holder 214 and the roller members 213 for urging the roller members 213 in the wedge direction, the roller members 213 can be promptly moved to the wedge effecting position. Hence, rotation of the spool 204 in the reverse direction can be quickly prevented, and operation precision can be improved.

Figure 10:
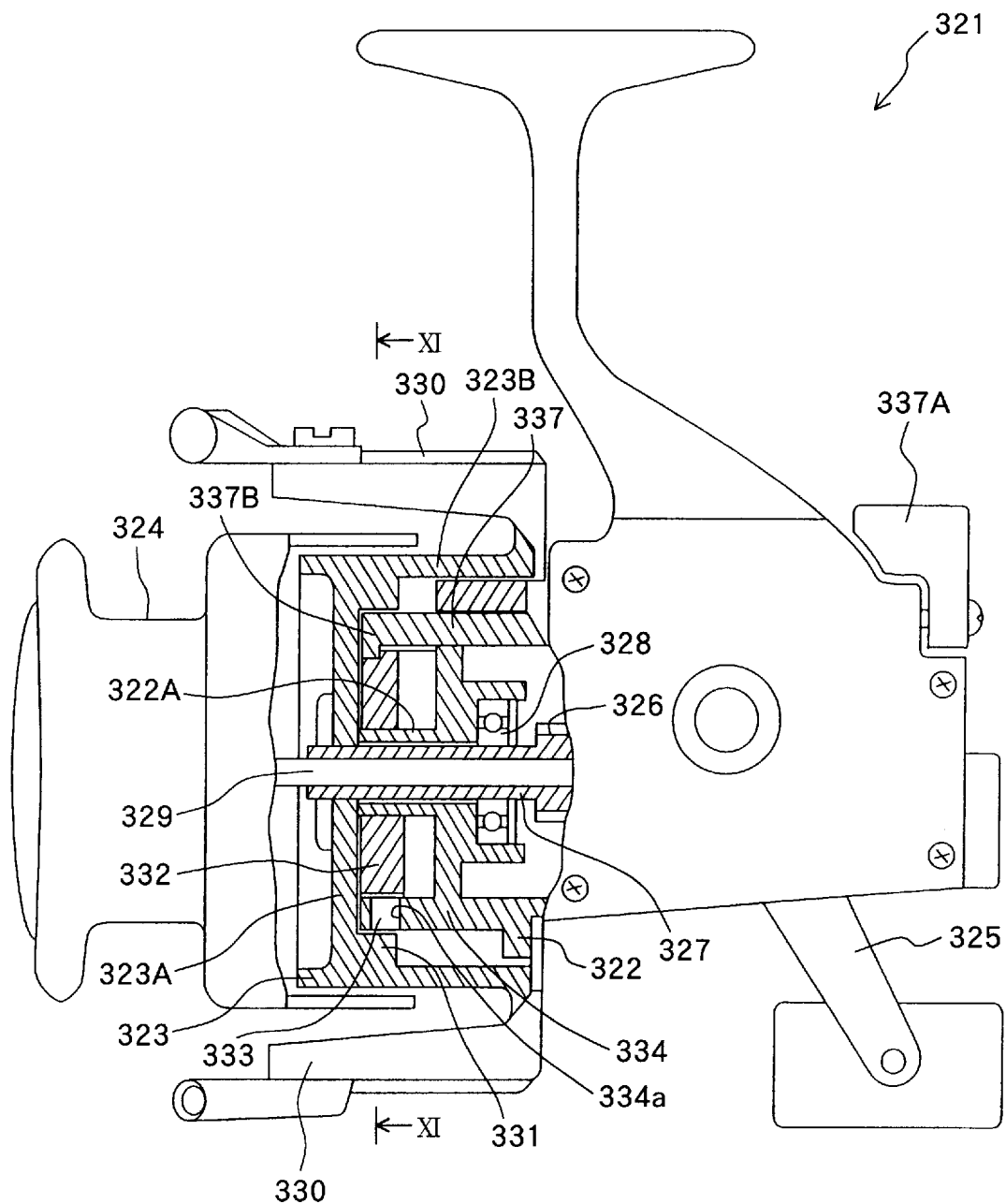
FIG. 10 is a side cross-sectional view showing an essential portion of a spinning reel incorporating a release preventing device according to a fifth embodiment of the present invention.

Next, a release preventing device for a fishing reel according to a fifth embodiment of the present invention will be described with reference to FIGS. 10 and 11. The release preventing device of the fifth embodiment applies to a spinning-type fishing reel. A spinning reel 321 includes a reel body 322, a rotor 323 having a bottom portion 323A and a cylindrical portion 323B, a spool 324, a handle 325, a pinion gear 326, a sleeve 327, a bearings 328, a spool shaft 329, a master gear and spool reciprocation mechanism (not shown), a pair of arm portions 330, and a bail (not shown) whose fundamental functions are the same as those of the second embodiment.

A one-way clutch of the fifth embodiment is configured mainly of an outer race 331, an inner race 332, roller members 333, and an annular holder 334. The outer race 331 is integrally formed with the rotor 323 and protrudes inward from the bottom portion 323A, which defines the hollow portion of the rotor 323. The inner peripheral surface of the outer race 331 is circular. In other words, the outer race 331 is provided by forming a circular depression on the bottom portion 323A coaxial with the rotor 323. Hence, there is no need to form the outer race 331 as a separate part.

The inner race 332 is supported on the reel body 322, which is a fixed part. Specifically, the reel body 322 integrally provides a cylinder portion 322A protruding forward to encircle the shaft sleeve 327. The inner race 332 is provided on the outer peripheral surface of the cylinder portion 322A opposing the outer race 331 and is rotatable by a prescribed amount. The inner peripheral surface of the inner race 332 is circular, but the outer peripheral surface is a regular hexagon. Hence, an approximately annular guide groove S3 is formed between the inner race 332 and the outer race 331. However, the width of the guide groove S3 measured in the radial direction of the shaft sleeve 327 is not regular. The width of the guide groove S3 is largest between the side central points on the outer peripheral surface of the inner race 332 and the inner peripheral surface of the outer race 331. At these points, the width of the guide groove S3 is wider than the diameter of the roller members 333. The width of the guide groove S3 is smallest between the corners of the inner race 332 and the outer race 331. At these points, the width of the guide groove S3 is smaller than the diameter of the roller members 333. An engaging depression 332a is formed in one part of the outer peripheral surface side of the inner race 332.

The annular holder 334 is provided within the guide groove S3 and protrudes out from the front face of the reel body 322. Similar to the fourth embodiment, retaining holes 334a are formed in the annular holder 334, diametrically penetrating the same at regular intervals in the peripheral direction. One of the roller members 333 is provided in each of these retaining holes 334a. The annular holder 334 has wall portions (see FIG. 10) for preventing the roller members 333 from moving in the axial direction. However, within the retaining hole 334a, the roller member 333 can move freely in the circumferential direction of the annular holder 334. Springs 336 are provided one in each of the retaining holes 334a for applying biasing force on the roller members 333 in the wedge direction, that is, the direction for preventing rotation of the outer race 331 by the inner race 332 and the roller members 333. When viewing the annular holder 334 in the peripheral direction, metal reinforcing members 335 such as thin iron plates are positioned one in each of the retaining holes 334a and at each peripheral end position of the retaining hole 334a and in contact with the roller members 333.

A switching member 337 penetrates through the reel body 322. The switching member 337 is rotatable about its own axis and can be maintained in either of two switching positions by way of position maintaining means (not shown). A control knob 337A is provided on the rear end portion of the switching member 337. An eccentric cam 337B is provided on the front end portion of the switching member 337 and engages with the engaging depression 332a in the inner race 332. When the control knob 337A is pivoted in either direction, the switching member 337 rotates about its axis, pivotally moving the eccentric cam 337B. The pressure applied by the eccentric cam 337B in the engaging depression 332a allows the inner race 332 to rotate in either the forward or reverse direction around the cylinder portion 322A of the reel body 322.

Figure 11:
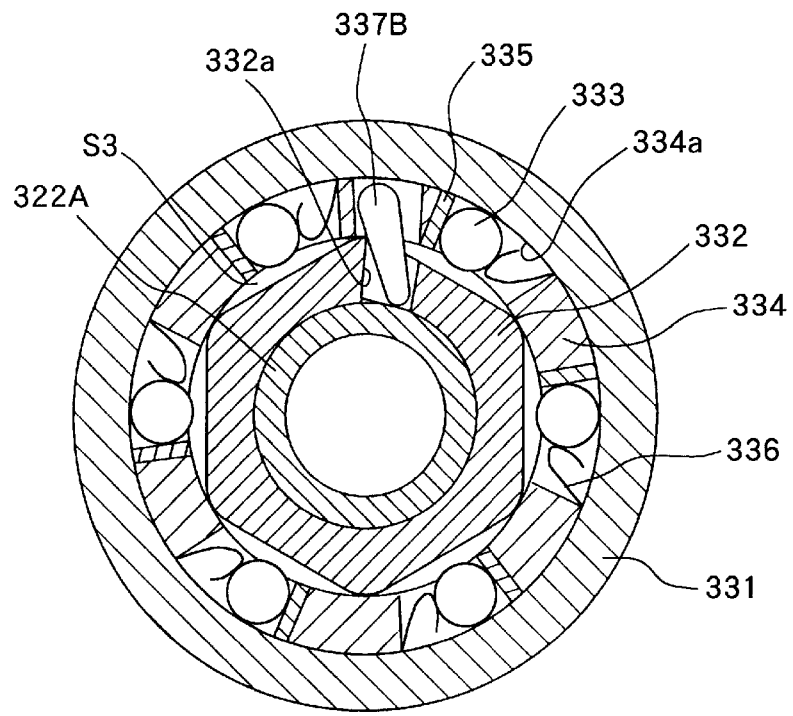
FIG. 11 is a cross-sectional view taken along the line XI—XI of FIG. 10.

With this arrangement, when the control knob 337A is pivotally moved in the direction causing the eccentric cam 337B to pivotally move about its own axis in the counterclockwise direction, as viewed in FIG. 11, the eccentric cam 337B will apply pressure to the right side wall of the engaging depression 332a and cause the inner race 332 to rotate in the clockwise direction. As a result, as shown in FIG. 11, the roller members 333 will be positioned near the side centers of the inner race 332. At this time, the distance between the side of the inner race 332 and the inner peripheral surface of the outer race 331 is larger than the diameter of the roller members 333, allowing the roller members 333 to rotate (the roller members 333 are in the non-wedge position). Therefore, the combination of the roller members 333 and the inner race 332 do not prevent the outer race 331 from rotating, and the handle 325 can be rotated in the forward or reverse directions. In other words, the rotor 323 can rotate in either the normal direction for winding in the fishing line or the reverse direction for paying out fishing line.

From this state, if the control knob 337A is pivotally moved in the opposite direction, the eccentric cam 337B will be pivotally moved in the clockwise direction in FIG. 11, applying pressure to the left side wall of the engaging depression 332a and causing the inner race 332 to rotate in the counterclockwise direction. As a result, the roller members 333 are positioned near the corner portions of the inner race 332. In other words, the roller members 333 are moved by the rotation of the inner race 332 until becoming pinched tightly between the outer race 331 and inner race 332. In this state, when the handle 325 is rotated in the winding-in direction, the outer race 31 rotates in the direction away from the corners of the inner race 332. Therefore, the roller members 333 and the inner race 332 do not prevent the outer race 331 from rotating. In other words, rotation in the winding-in direction is possible.

In this state, when the handle 325 is rotated in the paying-out direction, the outer race 331 attempts to rotate, but the roller members 333 and the inner race 332 prevent the outer race 331 from rotating, because the outer race 331 rotates in the direction toward the corners of the inner race 332 (the wedge direction). Hence, rotation in the paying-out direction (the release direction) is prevented.

As described above, in the fifth embodiment similar to the foregoing embodiments, rotation of the rotor 323 is prevented by the radially outward movement of the roller member 333, while radially inward movement of the roller member 333 is restrained by the inner race 332. Therefore, the point in which rotation is restricted is as far as possible from the axial center of the rotor 323, and accordingly, a large restrictive force can be obtained. Also, since the outer race 331 has a large diameter, the inner surface of the outer race 331 that serves as the restrictive surface for restricting rotation of the rotor 323 is as long as possible, enabling prompt restriction of rotation. Since rotation of the rotor 323 is restricted at the furthest point from the center of the rotor 323, the inner and outer races 332 and 331 will not become deformed or damaged even when a large rotational force is applied. Hence, the configuration described above increases durability of the release preventing device.

Further, by fixing the annular holder 334 to the reel body 322, which is a fixed part, to maintain the roller members 333, the restrictive force from the wedge effect and the restrictive position can be accurately obtained. Since inward movement of the roller members 333 is prevented by the inner race 332 and outward movement by the outer race 331, the roller members 333 are prevented from leaving the guide groove due to centrifugal force generated when the rotor 323 is rotated quickly.

Further, the inner race 332 is rotatably provided on the cylinder portion 322A of the reel body 322 and can be switched between two positions so that, when the inner race 332 is in the non-wedge position, the rotor 323 can rotate in both the forward and reverse directions, and when the inner race 332 is in the wedge position, the rotor 323 can be rotated in the forward direction only. Compared to the reel configuration in which the inner race is made immovable by moving the roller members 333, switching between the wedge position and non-wedge position with the configuration described above is more stable and reliable, and the amount of play when switching to the wedge position can be decreased.

Further, the annular metal reinforcing members 335 are provided on parts of the annular holder 334 in contact with the roller members 333 in order that the annular holder 334 itself can be constructed of a light material such as a synthetic resin, reducing the overall weight and simplifying the manufacturing process of the fishing reel.

Figure 13:
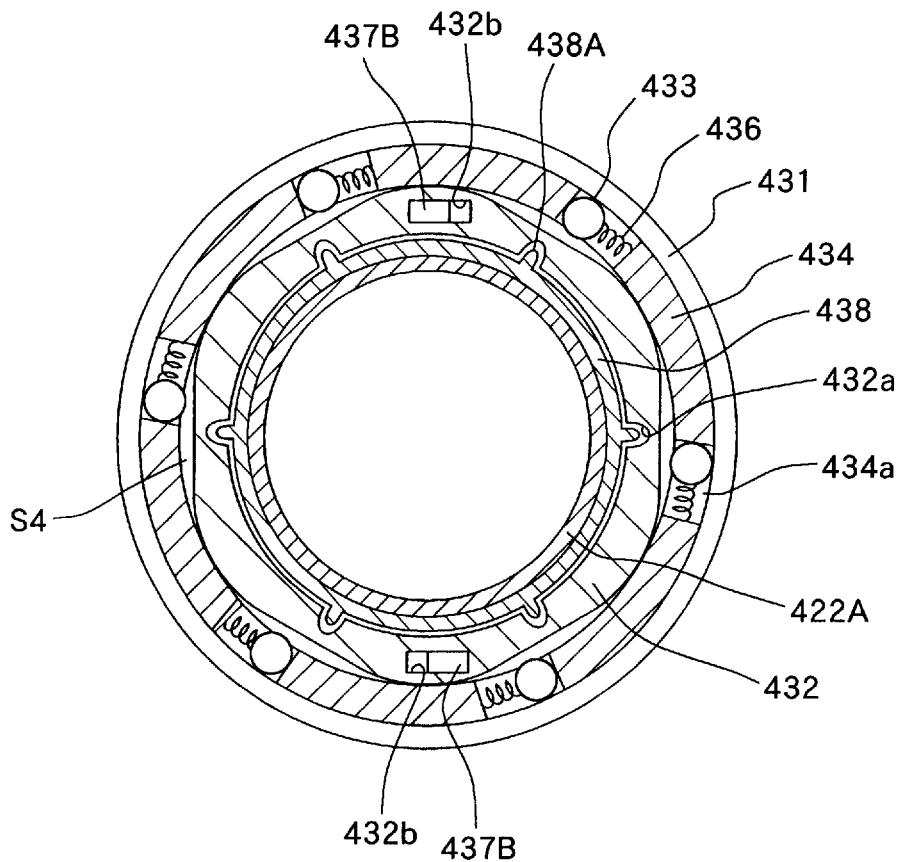
FIG. 13 is a cross-sectional view taken along the line XIII—XIII of FIG. 12.
Figure 14:
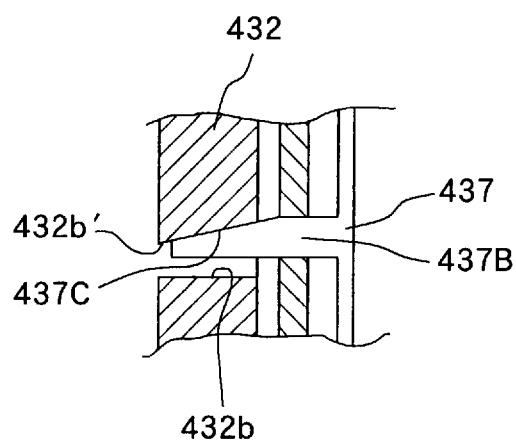
FIG. 14 is a cross-sectional view showing an essential portion of a switching mechanism for switching rotational position of an inner race according to the sixth embodiment.

Next, a release preventing device for a fishing reel according to a sixth embodiment of the present invention will be described with reference to FIGS. 12 through 14. The release preventing device of the sixth embodiment, like the devices of the third and fifth embodiments, applies to a spinning-type fishing reel. However, the position of the outer race and the mechanism for switching the rotational position of the inner race of the sixth embodiment differ from those of the third and fifth embodiments.

In the release preventing device of the sixth embodiment, a rotor 423 includes a bottom portion 423A and a cylindrical portion 423B, which form a hollow portion in the back of the rotor 423. An outer race 431 having an annular shape is provided on the inner peripheral surface of the cylindrical portion 423B protruding in the radial direction of the rotor 423. The inner peripheral surface of the outer race 431 is circular. The front end of a reel body 422 is positioned inside the hollow portion in the rotor 423. The reel body 422 rotatably supports a shaft sleeve 427 by bearings 428. A cylinder portion 422A is integrally formed on the reel body 422 and is coaxial with the shaft sleeve 427. A cylindrical collar 438 is rotatably provided around the outer peripheral surface of the cylinder portion 422A of the reel body 422. An inner race 432 is disposed over the outer peripheral surface of the collar 438. Hence, the inner race 432 can rotate together with the collar 438 around the cylinder portion 422A.

The inner diameter of the inner race 432 is slightly larger than the outer diameter of the collar 438. Further, engaging protrusions 438a extend in the axial direction of the collar 438 and protrude radially outwardly from the outer peripheral surface thereof. Engaging depressions 432a having larger contours than the engaging protrusions 438a are formed on the inner peripheral surface of the inner race 432. These engaging depressions 432a extend in the axial direction of the inner race 432 and are capable of engaging with the engaging protrusions 438a. Hence, the inner race 432 is supported on the collar 438 and is approximately coaxial with the same. However, the inner race 432 can move diametrically to the collar 438 according to the difference in size between the engaging protrusions 438a and the engaging depressions 432a. In other words, the mounted position of the inner race 432 can be adjusted diametrically to the rotational axis. Hence, productivity can be increased by relaxing restrictions on the formation precision of the rotor 423 (the rotatable part) and the reel body 422 (the fixed part).

Penetrating holes 432b are formed in the inner race 432 at positions diametrically opposite each other. As shown in FIG. 14, the penetrating holes 432b have a sloped surface 432b'. A spring (not shown) is positioned between the inner race 432 and the reel body 422 for urging the inner race 432 in a non-wedge rotational direction.

An annular holder 434 is integrally provided on the front portion of the reel body 422. Retaining holes 434a are formed in the annular holder 434, each hole retaining a roller member 433 and a coil spring 436. As described in the foregoing embodiments, the retaining holes 434a are positioned in a guide groove S4, maintaining the roller members 433 to prevent them from moving in the axial direction. The coil springs 436 urge the roller members 433 in the wedge direction.

An operating knob 437A is pivotally movably supported on the reel body 422. The back end of a switching member 437 is pivotally connected to an internal end of the operating knob 437A. The switching member 437 is coaxially positioned in relation to the shaft sleeve 427 and can slide back and forth in the axial direction of the shaft sleeve 427. Positioning protrusions 437B are provided on the front end of the switching member 437 so as to protrude in the axial direction of the shaft sleeve 427. Penetrating holes are formed in the reel body 422 to allow the positioning protrusions 437B to pass. The front ends of the positioning protrusions 437B have sloped surfaces 437C similar to the sloped surfaces 432b' on the inner race 432 and slide along these surfaces 432b' when moving in and out of the penetrating holes 432b.

Figure 12:
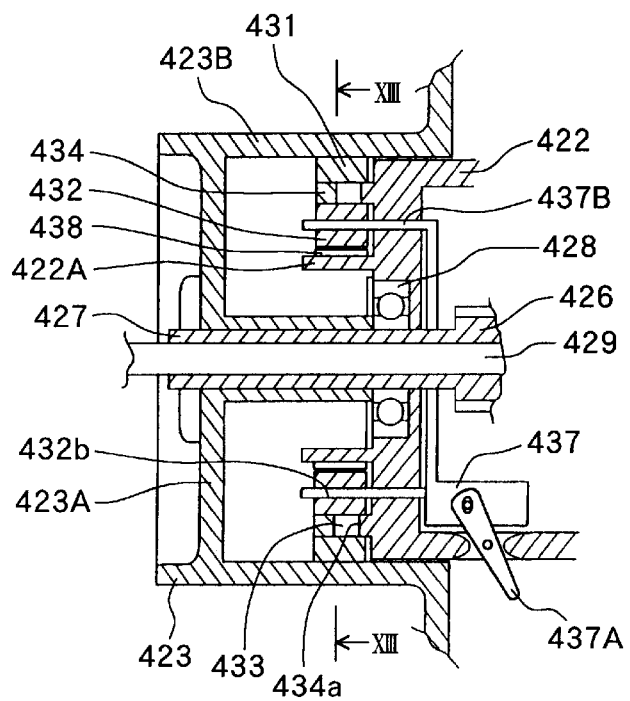
FIG. 12 is a cross-sectional view showing an essential portion of a release preventing device according to a sixth embodiment of the present invention.

With this arrangement, when the operating knob 437A is pivotally moved in the clockwise direction from the state shown in FIG. 12, the switching member 437 is pulled back. As a result, the front ends of the positioning protrusions 437B are pulled out from the retaining holes 434a of the annular holder 434, and the roller members 433 in the retaining holes 434a are urged only by the coil springs 436. When the switching member 437 is pulled back, the urging force of the sloped surfaces 437C with respect to the sloped surfaces 432b' is weakened, so that the inner race 432 is rotated in the non-wedge direction to the rotational position shown in FIG. 13 by the biasing force of the springs (not shown) positioned between the inner race 432 and the reel body 422. In other words, the roller members 433 become positioned near the side centers of the inner race 432. As described above, in this state, the rotor 423 can rotate in both the forward and reverse directions.

If the operating knob 437A is pivotally moved in the opposite direction, the switching member 437 is pushed forward to the position shown in FIG. 12. As a result, the front ends, that is, the sloped surfaces 437C of the positioning protrusions 437B, penetrate into the penetrating holes 432b of the inner race 432, opposing the biasing force of the springs (not shown), and the inner race 432 is rotated in the wedge direction. In other words, the roller members 433 are moved toward the corners of the inner race 432. In this state, the rotor 423 can rotate in the forward direction but not the reverse direction.

A release prevention device of the sixth embodiment has the effects the same as that of the device in the fifth embodiment. However, rotations of the rotor 423 are restricted at a position even further separated from the rotational axis of the rotor 423. Therefore, an even larger rotational restrictive force can be achieved, capable of restricting even faster rotation. Further, durability of the release preventing device can be improved, preventing deformation or damage to the outer race 431 and inner race 432, even when a large rotational force is applied. Also, since the annular holder 434 and inner race 432 can be formed and provided at positions adjacent to the front surface of the reel body 422, load on these components can be decreased, and therefore, preventing deformation and damage of the inner and outer races and the like.

Next, a release preventing device for a fishing reel according to a seventh embodiment of the present invention will be described with reference to FIG. 15. Similar to the device described in the fifth embodiment, the release preventing device of the seventh embodiment applies to a spinning-type fishing reel provided with a switching mechanism for switching the rotational positions of the inner race.

A one-way clutch of the seventh embodiment is configured mainly of an outer race 531, an inner race 532, roller members 533, an annular holder 534, and a switching member 537. A rotor is provided with a bottom portion 523A and the outer race 531 is fixed to the bottom portion 523A. The inner race 532 is rotatably supported on a cylinder portion 522A (equivalent to 422A in the sixth embodiment) of a reel body 522. Four screw holes 532a are formed in the inner race 532.

The inner peripheral surface of the inner race 532 is circular and can slidingly rotate around the cylinder portion 522A of the reel body 522. The outer peripheral surface of the inner race 532 is formed of cam surfaces in the shape of a regular or approximate octagon. Hence, an approximately annular guide groove S5 is formed between the inner race 532 and the outer race 531. However, the width of the guide groove S5 is not regular. The width of the guide groove S5 is largest between the side central points on the outer peripheral surface of the inner race 532 and the inner peripheral surface of the outer race 531. At these points, the width of the guide groove S5 is wider than the diameter of the roller members 533. The width of the guide groove S5 is smallest between the corners of the inner race 532 and the outer race 531. At these points, the width of the guide groove S5 is smaller than the diameter of the roller members 533.

Similar to the description in the fifth embodiment, the annular holder 534 is provided within the guide groove S5 and integrally protrudes out from the front face of the reel body. A plurality of retaining holes 534a are formed in the annular portion of the annular holder 534. The roller members 533 are provided at prescribed positions in these retaining holes 534a and are restricted from moving in the axial direction. A pair of metal reinforcing members 535, such as thin iron plates, are arranged on the surfaces in the retaining holes 534a that contact the roller members 533. The annular holder 534 itself can be constructed of a light material such as a synthetic resin, reducing the overall weight and simplifying the manufacturing process of the fishing reel. Further, the mechanical strength of this assembly is increased by providing the metal reinforcing members 535 in the areas supporting the roller members 533.

A switching member 537 having a disk shape is fixed to the surface on one axial end of the inner race 532. Screws 540 are screwed into the screw holes 532a to fix the switching member 537 to the inner race 532. The switching member 537 is capable of rotating relative to the cylinder portion 522A of the reel body 522. A protrusion 537A is provided on the outer peripheral surface of the switching member 537 and protrudes radially outwardly.

A switching member and control knob equivalent to the switching member 337 and control knob 337A described in the fifth embodiment are provided. However, the front end of the switching member is provided with a circular plate 538, rather than the eccentric cam 337B. A boss portion 538A is integrally provided on the circular plate 538 at a position eccentric to the rotational center of the switching member 537. A spring 536 is provided for resiliently urging the protrusion 537A.

Next, the configuration above will be described in relation to FIG. 10. When the control knob 337A is pivotally moved in one direction, the switching member 337 rotates around its own axis, and the circular plate 538 rotates eccentrically, causing the amount of resilient force applied by the spring 536 on the protrusion 537A to change. Here, the spring 536 urges the switching member 537 so as to rotate the annular holder 534 in the non-wedge direction. A pair of stopper members 541A and 541B with which the rotating protrusion 537A will contact are provided on the front surface of the reel body in order to restrict the range of rotation of the switching member 537.

Further, a torsion coil spring (not shown) is positioned between the inner race 532 and the annular holder 534. This torsion coil spring urges the inner race 532 in the wedge direction but has a smaller urging force than that of the spring 536.

Figure 15:
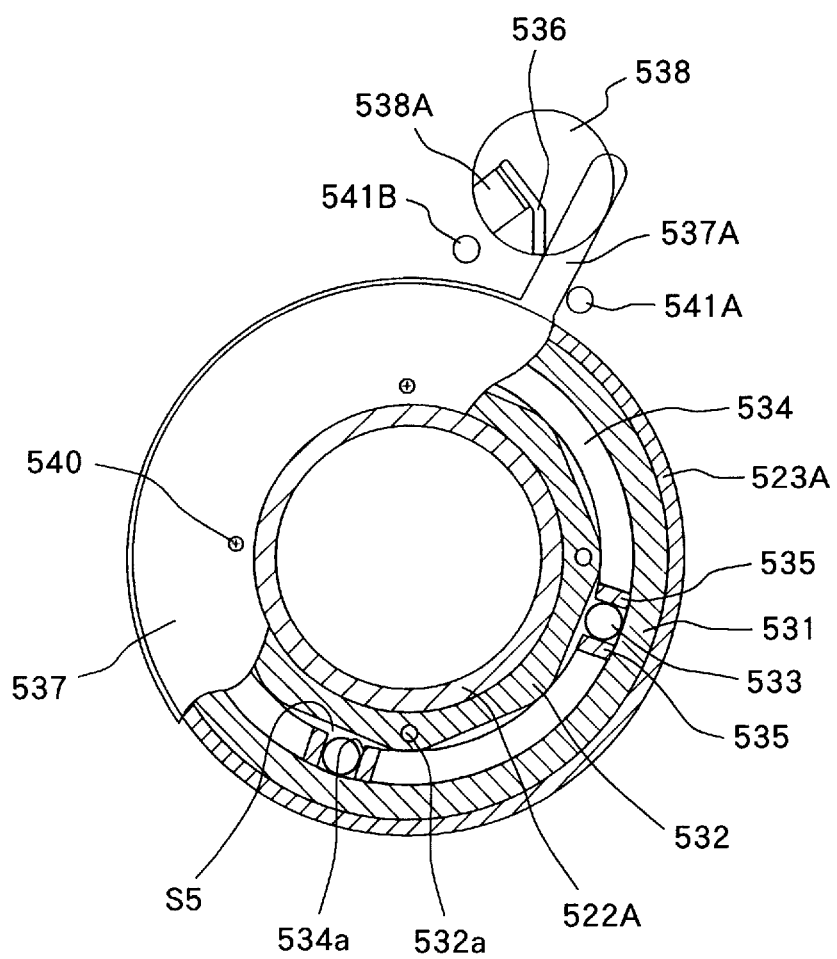
FIG. 15 is a cross-sectional view, corresponding to FIG. 13, showing an essential portion of a spinning reel incorporating a release preventing device according to a seventh embodiment of the present invention.

With this arrangement, when the control knob (equivalent to 337A in FIG. 10) is pivotally moved in one direction, the circular plate 538 on the switching member (equivalent to 337 in FIG. 10) will rotate about the rotational center of the switching member in the counterclockwise direction, as viewed in FIG. 15. The spring 536 will urge the protrusion 537A of the switching member 537 to rotate in the clockwise direction until the protrusion 537A abuts the stopper member 541A on the right side of FIG. 15. In this state, shown in FIG. 15, the sides of the inner race 532 have been rotated to positions in confrontation with the roller members 533 maintained in the metal reinforcing members 535 of the annular holder 534. At this time, the distance between the sides of the inner race 532 and the inner peripheral surface of the outer race 531 is larger than the diameter of the roller members 533, allowing the roller members 533 to rotate. Hence, the combination of the roller members 533 and the inner race 532 do not prevent the outer race 531 from rotating, and the handle can be rotated in the forward or reverse directions. In other words, the rotor can rotate in either the normal direction for winding in the fishing line or the reverse direction for paying out fishing line.

From this state, if the control knob (337A) is pivotally moved in the opposite direction, the switching member (337) will rotate around its own axis and the circular plate 538 will rotate eccentrically, causing the spring 536 to move away from the protrusion 537A. However, since the torsion coil spring (not shown) urges the inner race 532 to rotate in the wedge direction, the inner race 532 will rotate in the counterclockwise direction of FIG. 15 until the protrusion 537A abuts the stopper member 541B on the left side of FIG. 15. In this state, the corners of the inner race 532 have rotated to positions corresponding to the roller members 533. In other words, the roller members 533 are pinched tightly between the outer race 531 and inner race 532. In this state, when the handle is rotated in the winding-in direction, the outer race 531 rotates in a direction that decreases the pinching force on the roller members 533. Therefore, the roller members 533 and the inner race 532 do not prevent the outer race 531 from rotating. In other words, rotation in the winding-in direction is possible.

In this state, when the handle is rotated in the paying-out direction, the outer race 531 attempts to rotate, but the roller members 533 and the inner race 532 prevent the outer race 531 from rotating, because the outer race 531 rotates in the direction toward the corners of the inner race 532 (the wedge direction). Hence, rotation in the paying-out direction (the release direction) is prevented.

Further, when the roller members 533 are in the wedge position and the control knob is manipulated to rotate the switching member 537 in the non-wedge direction, the switching member 537 may not be rotatable if the roller members 533 are tightly pinched between the outer race 531 and the inner race 532. If the switching member (337) were directly connected to the protrusion 537A of the switching member 537 and the control knob (337A) were manipulated forcefully to rotate the switching member 537, the outer peripheral surface of the inner race 532, the roller members 533, and the inner peripheral surface of the outer race 531 could become deformed or damaged. However, according to the seventh embodiment, because the spring 536 is provided between the switching member (337) and the switching member 537, only the spring 536 itself changes shape when the roller members 533 are pinched between the outer race 531 and the inner race 532, preventing deformation and damage to the other parts. When the pinched state of the roller members 533 is removed, the switching member 537 is rotated in the non-wedge direction by force stored in the spring 536.

The release prevention device in the seventh embodiment has the same effects as the device described in the fifth embodiment. In addition, however, deformation and damage to the components can be prevented because the spring 536 applies resilient force to the inner race 532 to move the roller members 533 in the non-wedge direction.

While the invention has been described in detail and with reference to the specific embodiments thereof, it would be apparent to those skilled in the art that various changes and modifications may be made therein without departing from the spirit and scope of the invention.

For example, in the first and fourth embodiments, the one-way clutch using roller members is provided between the reel body (fixed part) of the double-bearing type fishing reel and the handle shaft (rotatable part). However, the one-way clutch could also be provided, for example, between the side plate attached to the reel body and the handle shaft, or between the drive shaft and the driven shaft in a motor-driven reel.

Further, in the first embodiment, the switching member 14 is rotatably supported on the outer peripheral surface of the inner race 12 and is slidable with respect to the surface of the reel body 2. However, it is also possible to rotatably attach the switching member to the other fixed part, to rotatably attach the switching member to the inner race fixed to the fixed part, or rotatably attach the switching member to an annular holder unrotatably fitted to the inner race. With these configurations, the switching member is rotated by an operating member supported on the fixed part, causing a positioning protrusion protruding from the switching member to move the roller members to the non-wedge position, releasing the rotating restriction. Hence, by manipulating the operating member, only the roller members are changed between the wedge position and the non-wedge position, and rotation in one direction of a one-way clutch can be alternately restricted and allowed. Accordingly, when reeling in a fish with the reel, switching between preventing reverse rotation of the reel and allowing such rotation can be accomplished quickly and reliably, preventing such problems as the fishing line breaking.

Further, in the second embodiment, the annular metal body 35 is supported to move freely in a direction diametric to the rotational center of the rotor 23, and the annular outer race 31 is fixed to the inner peripheral surface of the ring portion of the annular metal body 35. However, the outer race can be integrally formed with the bottom portion 23A of the rotor and provided coaxially with the rotor, or a depressed portion forming the inner peripheral surface of the outer race can be coaxially provided on the bottom portion 23A of the rotor. With this configuration, it is not necessary to form the outer race as a separate component.

Further, in the second and sixth embodiments described above, the one-way clutch using roller members is provided between the reel body (fixed part) of a spinning-type fishing reel and the bottom wall (rotatable part) of a hollow portion formed in the back portion of the rotor. However, the one-way clutch could also be provided, for example, between the reel body and the handle shaft, between the reel body and the master gear, or between the reel body and the pinion, or the like, providing the clutch is between the rotatable part and the fixed part.

Further, in the second embodiment described above, the outer race 31 is fixed to the inner peripheral surface of the ring portion of the annular metal body 35. However, the inner peripheral surface of the annular metal body could itself be used as the outer race. Further, the inner race 32 is fixed to the outer peripheral surface of the sleeve 22A of the reel body 22. However, the inner race could instead be integrally formed with the reel body.

Further, in the second embodiment described above, the annular holder can be rotatably fitted on the annular metal body 35. With this configuration, ease of assembly can be further improved by unit assembly of either the annular holder and the annular metal body or the annular holder and the outer race provided on the annular metal body.

Further, in the second embodiment described above, the spring 38 is interpositioned on the operating member 37 to urge the switching member 34 in the non-wedge direction. However, the spring could instead be provided on the switching member 34. Also, In the second embodiment described above, the spring (not shown) is provided between the inner race 32 and the annular holder 39 to urge the roller members in the wedge direction. However, the spring could instead be provided between the protrusion 34A of the switching member 34 and the reel body 22, as described in the first embodiment, or spring members could be arranged in each of the retaining holes 39a formed in the annular holder 39 to urge the roller members 33 individually in the wedge direction.

Further, in the second embodiment described above, the pair of stopper members 40A protruding from the reel body 22 are positioned to contact the protrusions 34A of the switching member 34 in order to restrict the rotating range of the switching member 34. However, the rotating range of the switching member 34 could instead be restricted by adjusting the length of the arcuate slots 34a, removing the need for stopper members.

Further, in the second embodiment described above, unit assembly can be achieved by, for example, rotatably fitting together the outer peripheral surface of the annular holder 39 and the inner peripheral surface of the outer race 31, or rotatably fitting together the inner peripheral surface of the annular holder 39 and the outer peripheral surface of the inner race 32.

Further, in the second embodiment described above, the spring 38 contacts the protrusion 34A of the switching member 34 to urge the switching member 34 in the non-wedge direction. However, the spring could instead be used to exert an urging force between the switching member 34 and the annular holder 39.

Further, in the third embodiment described above, the annular holder 150 is maintained immovably, and the switching member 134 is provided with operating rods 134B capable of moving in and out of the retaining holes, and the end of rods are tapered into sloped surfaces 134C, and roller members 133 maintained in the retaining holes are moved by pressure from the sloped surface 134C. However, the annular holder 150 could be rotatably provided on the inner race 132. With this configuration, the annular holder 150 is rotated directly by pressure from the sloped surface 134C, and the roller members 133 can be moved by the rotation of the annular holder. Hence, by manipulating the operating knob 137A, the annular holder and roller members are changed between the wedge position and the non-wedge position, and rotation in one direction of a one-way clutch can be alternately restricted and allowed. Accordingly, when reeling in a fish with the reel, switching between preventing reverse rotation of the reel and allowing such rotation can be accomplished quickly and reliably, preventing such problems as the fishing line breaking.

Further, in the third embodiment described above, an annular holder as described in the second embodiment could be rotatably supported on the inner race 132. With this configuration, the roller members would be restricted from moving in the axial direction by the retaining holes formed in the annular holder. As a result, movement of the roller members between the inner race 132 provided on the reel body 122 and the outer race 131 supported on the rotor 123 can be stabilized, and a precise wedge effect can be achieved. Further, by supporting the roller members on the annular holder, which is supported by the inner race, unit assembly can be achieved, improving the ease of assembly and preventing assembling error.

Further, in the fifth, sixth, and seventh embodiments described above, the inner race is rotatably provided on the cylinder portion integrally formed with the reel body. However, as described in the fourth embodiment, the inner race could be fixed to merely allow rotation of the rotor in the winding-in direction and prevent rotation in the release direction.

Further, in the fifth, sixth, and seventh embodiments described above, the inner race is rotatably provided on the cylinder portion of the reel body. However, the inner race could be rotatably fitted over the annular holder, which is supported on the fixed part. In this case, the outer peripheral surface of the inner race is a polygon-shaped cam portion, and an annular protrusion is integrally provided on the axial end of the inner race and protrudes outward from the outer peripheral surface of the inner race in the radial direction. Further, the annular protrusion can be rotatably fitted on the inner peripheral surface of the annular holder. If the inner race is rotatably fitted on the annular holder, unit assembly with the annular holder, including the roller members supported therein, and the inner race can be achieved, improving the ease of assembly and preventing assembling error.

Further, the inner race could be rotatably supported on such rotatable parts such as the shaft sleeve of the rotor or the handle shaft. In other words, the inner race can be stationarily maintained so as to not rotate even if the rotatable part rotates, or the rotations of the inner race can be controlled independently of the rotations of the rotatable part. For example, in the fifth embodiment, the inner race 332 can be rotatably maintained on the shaft sleeve 327 of the rotor. With this configuration, a collar or low friction member would be positioned between the shaft sleeve 327 and the inner race 332 in order to achieve smoother rotation and to prevent abrasion.

Further, in the fourth embodiment described above, the sides on the outer peripheral surface of the inner race could be formed as a regular or approximate square instead of a regular or approximate square having curved sides.

Further, in the fifth embodiment described above, the inner race 332 is directly rotated by the eccentric cam 337B. However, as shown in FIG. 15, the annular switching member 537 could be fixed to the inner race 332 so that the eccentric cam 337B works on the switching member 537, which causes the inner race to rotate, in a manner similar to the seventh embodiment.

Further, in the sixth embodiment described above, the inner race 432 is rotated by the sliding movement in the axial direction of the switching member 437. However instead, arcing slots could be formed in the front wall of the reel body 422 shown in FIG. 12, and a circular plate-shaped switching member 537 as described in the seventh embodiment could be rotatably provided to the back of the reel body 422 in place of the switching member 437. Screws could be screwed in through the switching member 537 so as to pass through the arcing slots and screw into the inner race. The switching member could be rotated using a switching mechanism as described in the seventh embodiment (switching member 337, circular plate 538, and spring 536). The screws provided integrally with the switching member move into the arcing slots to rotate the inner race.

Further, in all the embodiments described above, balls could be used in place of the roller members.

What is claimed is:

1. A release preventing device for a fishing reel including a handle, a fishing line winding member, a fixed part, and a rotatable part rotatably supported by the fixed part for transmitting rotation force provided by the handle or an electric source to the fishing line winding member; the release preventing device comprising:

a one-way clutch provided between the fixed part and the rotatable part, the one-way clutch comprising:
at least one roller member having a diameter;
an inner race provided to the fixed part and having an outer periphery formed with a cam surface in contact with the roller member for restraining radially inner movement of the roller member, the cam surface having a regular polygonal shape provided with corners and sides; and
an outer race provided at the rotatable part and positioned radially outwardly of the inner race in concentrical relation thereto, the outer race having an inner peripheral surface in confrontation with the cam surface, the roller member being movable relative to the inner and outer races between a wedge position and a non wedge position, a distance between a center of each side of the cam surface and the inner peripheral surface of the outer race being greater than the diameter of the roller member for allowing the outer race to be rotatable in both fishing line rewinding and releasing directions when the roller member is moved to the non-wedge position, and a distance between each corner of the inner race and the inner peripheral surface of the outer race being smaller than the diameter of the roller member for pinching the roller member between the inner and outer races to provide a wedge effect for preventing the rotatable part from being rotated in a fishing line releasing direction when the roller member is moved to the wedge position.

2. The release preventing device as claimed in claim 1, wherein the inner race is unrotatably secured to the fixed part.

3. The release preventing device as claimed in claim 2, wherein the fishing reel is a double bearing type reel having a handle shaft which is a component of the rotatable part, and a reel body which is a component of the fixed part, the inner race being supported to the reel body, and the outer race being coaxially fixed to the handle shaft.

4. The release preventing device as claimed in claim 3, further comprising:
 a switching member holding the roller member for moving the roller member between the wedge position and the non-wedge position, the switching member being rotatably supported to the fixed part and having an engaging portion; and,
 an operating member supported by the fixed part and connected to the engaging portion for moving the engaging portion between a first position providing the wedge position and a second position.

5. The release preventing device as claimed in claim 4, further comprising a biasing member interposed between the switching member and the fixed part for normally urging the switching member toward the wedge position.

6. The release preventing device as claimed in claim 3, wherein the inner race is movable in a diametrical direction of the handle shaft.

7. The release preventing device as claimed in claim 3, further comprising an annular holder disposed between an annular space defined between the outer race and the inner race, the annular holder being provided to the fixed part and formed with retaining holes for retaining therein the roller members.

8. The release preventing device as claimed in claim 7, further comprising springs, each one of the springs being retained in each one of the retaining holes for biasing each one of the roller members toward the wedge position.

9. The release preventing device as claimed in claim 2, wherein the fishing reel is a spinning reel and the fishing line winding member comprises a rotor of the spinning reel, the rotor having a bottom wall and a cylindrical portion which defines a cylindrical space therein, the inner race and the outer race being positioned in the cylindrical space.

10. The release preventing device as claimed in claim 9, wherein the outer race comprises an annular metal body supported to the rotor coaxially therewith.

11. The release preventing device as claimed in claim 10, wherein the annular metal body is movable in a diametrical direction of the rotor.

12. The release preventing device as claimed in claim 9, further comprising an annular holder disposed in a space defined between the inner race and the outer race, the annular holder being rotatably fitted over the inner race, the roller member being retained in the annular holder with preventing axial displacement thereof.

13. The release preventing device as claimed in claim 12, further comprising:
 a switching member for moving the roller member between the wedge position and the non-wedge position, the switching member being rotatably supported to the fixed part and connected to the annular holder, the switching member having a protrusion; and
 an operating member supported by the fixed part and engageable with the protrusion for moving the protrusion between a first position providing the wedge position and a second position providing the non-wedge position.

14. The release preventing device as claimed in claim 13, further comprising a biasing member interposed between the inner race and the annular holder for normally urging the annular holder toward the wedge position.

15. The release preventing device as claimed in claim 14, further comprising a resilient member disposed between the operating member and the switching member, the resilient member being movable toward and away from the protrusion for urging the roller member toward the non-wedge position.

16. The release preventing device as claimed in claim 14, wherein the annular holder is formed with at least one retaining hole for retaining therein the roller member, and the annular holder further comprises a pair of metal reinforcing members defining a contour of the retaining hole and spaced away from each other in a circumferential direction of the annular holder.

17. The release preventing device as claimed in claim 2, wherein the fishing reel is a spinning reel and the fishing line winding member comprises a rotor of the spinning reel, the rotor including a cylindrical portion having an inner peripheral surface, the outer race being disposed at the inner peripheral surface.

18. The release preventing device as claimed in claim 17, further comprising an annular holder fixed to the inner race, the roller member being retained in the annular holder with preventing axial displacement thereof.

19. The release preventing device as claimed in claim 18, further comprising:
 a switching member for moving the roller member between the wedge position and the non-wedge position, the switching member being slidably supported to the fixed part and having an operation rod insertable into and retractable from the annular holder; and
 an operating member supported by the fixed part and connected to the switching member for moving the switching member between a first position providing the wedge position and a second position providing the non-wedge position.

20. The release preventing device as claimed in claim 1, wherein the inner race is rotatably supported to the fixed part, and the device further comprising an annular holder provided to the fixed part and positioned at an annular space defined between the inner race and the outer race, the annular holder retaining therein the roller member, a rotation of the inner race providing different positional relationship between the cam surface of the inner race and the roller member.

21. The release preventing device as claimed in claim 20, further comprising spring member disposed between the annular holder and the roller member for urging the roller member toward the wedge position.

22. The release preventing device as claimed in claim 20, further comprising:
 a switching member rotatably supported to the fixed part and engaged with the inner race, a rotation of the switching member providing a rotation of the inner race toward one of the wedge position and the non-wedge position.

23. The release preventing device as claimed in claim 20, further comprising:
a switching member slidably supported to the fixed part and having an operation rod insertable into and retractable from the inner race; and
an operating member supported by the fixed part and connected to the switching member for moving the switching member between a first position providing the wedge position and a second position providing the non-wedge position.

24. The release preventing device as claimed in claim 20, further comprising a switching member rotatably supported to the fixed part and fixed to the inner race, a rotation of the switching member providing a rotation of the inner race toward one of the wedge position and the non-wedge position, the switching member having a protrusion; and an operating member supported by the fixed part and engageable with the protrusion for moving the protrusion between a first position providing the wedge position and a second position providing the non-wedge position.

\* \* \* \* \*